United States Patent
Bordeleau et al.

(10) Patent No.: US 11,024,144 B2
(45) Date of Patent: Jun. 1, 2021

(54) REDIRECTING TRAFFIC FROM MOBILE DEVICE TO INITIAL SLICE SELECTOR FOR CONNECTION

(71) Applicant: VMware, Inc., Palo Alto, CA (US)

(72) Inventors: Marc-Andre Bordeleau, Shawinigan (CA); Raja Kommula, Cupertino, CA (US); Jeremy Tidemann, Urbana, IL (US); Constantine Polychronopoulos, Saratoga, CA (US); Edward Choh, Richmond (CA); Ojas Gupta, Mountain View, CA (US); Georgios Oikonomou, Patras (GR); Robert Kidd, Champaign, IL (US)

(73) Assignee: VMWARE, INC., Palo Alto, CA (US)

( * ) Notice: Subject to any disclaimer, the term of this patent is extended or adjusted under 35 U.S.C. 154(b) by 21 days.

(21) Appl. No.: 16/443,815

(22) Filed: Jun. 17, 2019

(65) Prior Publication Data

US 2020/0273314 A1    Aug. 27, 2020

Related U.S. Application Data

(60) Provisional application No. 62/809,657, filed on Feb. 24, 2019, provisional application No. 62/809,558, filed on Feb. 22, 2019.

(51) Int. Cl.
  *G08B 21/10* (2006.01)
  *H04W 4/90* (2018.01)
  (Continued)

(52) U.S. Cl.
  CPC .......... *G08B 21/10* (2013.01); *G08B 25/016* (2013.01); *G08B 26/008* (2013.01); *G08B 27/001* (2013.01); *H04W 4/90* (2018.02)

(58) Field of Classification Search
  CPC ..... H04W 12/06; H04W 16/10; H04W 16/28; H04W 24/10; H04W 28/0221;
  (Continued)

(56) References Cited

U.S. PATENT DOCUMENTS 6,504,818 B1    1/2003    Levine
9,124,538 B2    9/2015    Koponen et al.
(Continued)

FOREIGN PATENT DOCUMENTS

WO    2019129374 A1    7/2019
WO    2020171957 A1    8/2020

OTHER PUBLICATIONS

Non-Published Commonly Owned International Patent Application PCT/US2020/043648, filed Jul. 26, 2020, 55 pages, VMware, Inc.
(Continued)

*Primary Examiner* — Omeed Alizada
(74) *Attorney, Agent, or Firm* — Adeli LLP

(57) ABSTRACT

Some embodiments provide a method for a first network slice selector that selects network slices for connections from endpoint devices located within a first geographic range. The method selects a network slice for a connection between a mobile endpoint device and a network domain that originates when the mobile endpoint device is located within the first geographic range. The method stores state that maps the connection to the selected network slice. The method forwards data traffic belonging to the connection from the mobile endpoint device onto the selected network slice using the stored state. After the mobile endpoint device moves from the first geographic range to a second geographic range, the method receives data traffic belonging to the connection from a second network slice selector that selects network slices for connections from endpoint devices
(Continued)

within the second geographic range and forwards said received data traffic onto the selected network slice.

20 Claims, 12 Drawing Sheets

(51) Int. Cl.
*G08B 25/01* (2006.01)
*G08B 26/00* (2006.01)
*G08B 27/00* (2006.01)

(58) Field of Classification Search
CPC ............. H04W 28/0247; H04W 48/18; H04W 72/0433; H04W 72/12; H04W 84/00; H04W 8/02
See application file for complete search history.

(56) References Cited

U.S. PATENT DOCUMENTS

| | | | |
|---|---|---|---|
| 10,111,163 B2 | 10/2018 | Vrzic et al. | |
| 10,555,134 B2 | 2/2020 | Shaw et al. | |
| 10,609,530 B1 | 3/2020 | Pahl et al. | |
| 10,708,143 B2 | 7/2020 | Zhang et al. | |
| 10,834,669 B2 | 11/2020 | Bordeleau et al. | |
| 2003/0026205 A1 | 2/2003 | Mullendore et al. | |
| 2013/0125230 A1* | 5/2013 | Koponen | H04L 45/64 726/13 |
| 2015/0074264 A1 | 3/2015 | Izhak-Ratzin et al. | |
| 2015/0381493 A1 | 12/2015 | Bansal et al. | |
| 2016/0344565 A1 | 11/2016 | Batz et al. | |
| 2017/0054595 A1 | 2/2017 | Zhang et al. | |
| 2017/0085628 A1 | 3/2017 | Mahindra et al. | |
| 2017/0142591 A1 | 5/2017 | Vrzic | |
| 2017/0264483 A1 | 9/2017 | Lambeth et al. | |
| 2017/0289791 A1 | 10/2017 | Yoo et al. | |
| 2018/0183866 A1 | 6/2018 | Gunda et al. | |
| 2018/0219762 A1 | 8/2018 | Wang et al. | |
| 2018/0270713 A1 | 9/2018 | Park et al. | |
| 2018/0270743 A1 | 9/2018 | Callard et al. | |
| 2018/0332441 A1 | 11/2018 | Shaw et al. | |
| 2018/0368060 A1* | 12/2018 | Kedalagudde | H04L 47/78 |
| 2019/0053104 A1 | 2/2019 | Qiao et al. | |
| 2019/0075082 A1 | 3/2019 | Adam et al. | |
| 2019/0123963 A1 | 4/2019 | Tang et al. | |
| 2019/0124704 A1 | 4/2019 | Sun et al. | |
| 2019/0150080 A1 | 5/2019 | Davies et al. | |
| 2019/0158364 A1 | 5/2019 | Zhang et al. | |
| 2019/0159117 A1 | 5/2019 | Kuge et al. | |
| 2019/0174573 A1 | 6/2019 | Velev et al. | |
| 2019/0187999 A1 | 6/2019 | Lu et al. | |
| 2019/0191309 A1 | 6/2019 | Kweon et al. | |
| 2019/0200286 A1 | 6/2019 | Usui et al. | |
| 2019/0287146 A1 | 9/2019 | Maitland et al. | |
| 2019/0373520 A1 | 12/2019 | Sillanpää | |
| 2020/0007445 A1 | 1/2020 | Anwer et al. | |
| 2020/0053531 A1 | 2/2020 | Myhre et al. | |
| 2020/0067831 A1 | 2/2020 | Spraggins et al. | |
| 2020/0077327 A1 | 3/2020 | Duan et al. | |
| 2020/0120721 A1 | 4/2020 | Lau et al. | |
| 2020/0137621 A1 | 4/2020 | Yang et al. | |
| 2020/0213360 A1 | 7/2020 | Ojha et al. | |
| 2020/0275281 A1 | 8/2020 | Bordeleau et al. | |
| 2020/0275357 A1 | 8/2020 | Bordeleau et al. | |
| 2020/0275358 A1 | 8/2020 | Bordeleau et al. | |
| 2020/0275359 A1 | 8/2020 | Bordeleau et al. | |
| 2020/0275360 A1 | 8/2020 | Bordeleau et al. | |
| 2020/0314029 A1 | 10/2020 | Gopinath et al. | |

OTHER PUBLICATIONS

Non-Published Commonly Owned Related International Patent Application PCT/US2020/016833 with similar specification, filed Feb. 5, 2020, 95 pages, VMware, Inc.
Non-Published Commonly Owned Related U.S. Appl. No. 16/443,810 with similar specification, filed Jun. 17, 2019, 95 pages, VMware, Inc.
Non-Published Commonly Owned Related U.S. Appl. No. 16/443,812 with similar specification, filed Jun. 17, 2019, 38 pages, VMware, Inc.
Non-Published Commonly Owned Related U.S. Appl. No. 16/443,813 with similar specification, filed Jun. 17, 2019, 49 pages, VMware, Inc.
Non-Published Commonly Owned Related U.S. Appl. No. 16/443,816 with similar specification, filed Jun. 17, 2019, 54 pages, VMware, Inc.
Non-Published Commonly Owned Related U.S. Appl. No. 16/443,818 with similar specification, filed Jun. 17, 2019, 64 pages, VMware, Inc.
Non-Published Commonly Owned U.S. Appl. No. 16/568,322, filed Sep. 12, 2019, 55 pages, VMware, Inc.
Non-Published Commonly Owned U.S. Appl. No. 16/568,325, filed Sep. 12, 2019, 55 pages, VMware, Inc.
Non-Published Commonly Owned U.S. Appl. No. 16/568,330, filed Sep. 12, 2019, 55 pages, VMware, Inc.
Non-Published Commonly Owned U.S. Appl. No. 16/568,332, filed Sep. 12, 2019, 55 pages, VMware, Inc.
Blenk, Andreas, et al., "Survey on Network Virtualization Hypervisors for Software Defined Networking", IEEE Communications Surveys & Tutorials, Jan. 27, 2016, 32 pages, vol. 18, No. 1, IEEE.

* cited by examiner

REDIRECTING TRAFFIC FROM MOBILE DEVICE TO INITIAL SLICE SELECTOR FOR CONNECTION

BACKGROUND

Communications service provider networks receive and process many types of traffic from many different types of devices, especially moving forward. For example, these networks will have traffic from mobile phones, Internet of Things (IoT) devices, self-driving automobiles, home computers, etc. Ideally, this traffic should be treated differently by the network based on the type of application (e.g., streaming video, web browsing, telephone calls, etc.), the type of device (e.g., data traffic for self-driving automobiles need extremely low latency), and other differentiators. While 4G and 5G standards have introduced a certain level of traffic differentiation, more adaptable network slicing, that can be generalized to other types of networks, is desirable.

BRIEF SUMMARY

Some embodiments provide methods for establishing a virtual service network across a set of datacenters. The set of datacenters across which the virtual service network is established may include, e.g., one or more public clouds, a software-defined wide area network (SD-WAN) that spans public and private clouds, a telecommunications service provider access network (e.g., spanning a combination of the radio access network, edge clouds, and core clouds), or other types of datacenters. The virtual service network of some embodiments includes multiple network slices each of which provides different network services to data messages assigned to the network slice.

In some embodiments, when a device (e.g., a mobile endpoint device in the telecommunications context) transmits a data message onto such a network, a network slice selector initially processes the data message. The network slice selector assigns the data message to one of the network slices of the virtual service network and handles service chaining operations to ensure that the data message is processed by the correct set of network services for the assigned slice. In different embodiments, this network slice selector may be implemented by a virtual machine (VM), a containerized function, a software forwarding element (e.g., a flow-based forwarding element) operating within a VM, within a container or within virtualization software of a host computer, a set of modules executing outside of a forwarding element (e.g., between a VM and a port of a forwarding element) within virtualization software of a host computer, a hardware forwarding element (e.g., a programmable switch), or other implementations.

In some cases, many network slice selectors are configured to implement a virtual service network. In the telecommunications service provider example, some embodiments configure a network slice selector for each cellular tower, base station, or other aspect of the access network. The telecommunications service provider access network of some embodiments includes edge clouds for each cellular tower, and configures at least one network slice selector at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM) or at a designated device (e.g., a specific nearby switch or router, a dedicated VM).

Each network slice of a virtual service network, in some embodiments, includes one or more network services such as firewalls, load balancers, network address translation, metering (e.g., for billing purposes), virtual private network (VPN) gateways, radio access network (RAN) functions (e.g., distributed unit and centralized unit functions), evolved packet core (EPC) functions (e.g., home subscriber server, serving gateway, packet data network gateway, mobility management entity), or other types of network functions. These network functions may be implemented as virtual network functions (VNFs), physical network functions (PNFs), and/or cloud network functions (CNFs) in different embodiments.

When a network slice selector assigns a data message to a network slice, the slice selector is responsible in some embodiments for performing the service chaining to ensure that the data message traverses the network services of the assigned slice in the correct order. In some embodiments, the slice selector transmits the data message to the first network service (e.g., the VM, container, or other data compute node that implements the network service) and maintains context information for that data message. Upon the first network service completing its processing of the data message, the first network service returns the data message to the slice selector. The slice selector then uses the maintained context information to transmit the data message to the next network service, and so on. In some embodiments, when the full network slice is implemented across multiple datacenters, a similar service chaining module operates at each datacenter to handle the service chaining for the slice within its own datacenter. These service chaining modules may be implemented in the same manner as the network slice selectors in some embodiments (e.g., as VMs, as forwarding elements in VMs or virtualization software). A service chaining module of some embodiments receives a data message as the data message ingresses to the datacenter, identifies the slice for the data message (e.g., based on context information provided with the data message by the network slice selector or service chaining module of the previous datacenter), and provides the data message to the next network service within the datacenter. Other embodiments use distributed service chaining rather than returning data messages to a designated slice selector or service chaining module in each datacenter (e.g., by adding tags to the packet headers to indicate the order of services in a selected network slice).

In some embodiments, a controller hierarchy configures various entities within the one or more datacenters to implement a virtual service network. A high-level controller (referred to herein as a virtual service network (VSN) controller) receives configuration data for the virtual service network from a user (e.g., a telecommunications provider, a datacenter tenant) through an interface (e.g., a set of REST APIs, a graphical interface, a command line interface). This VSN controller coordinates sets of other controllers that configure the entities in the datacenters in which the VSN is implemented. In some embodiments, each datacenter has its own suite of lower-level controllers. These controllers may include compute controllers (e.g., for configuring VMs that implement the VNFs), network controllers (e.g., for configuring forwarding elements to transmit data messages between the slice selector(s) and the network services), storage controllers, and SDN controllers (e.g., for configuring the slice selectors and/or gateways that transmit data messages between the datacenters).

Network slice selectors may assign data messages to slices using different techniques in different embodiments. Slice selection may be based on a combination of layer 2 to layer 4 (L2-L4) headers and/or by performing deep packet inspection (e.g., to classify traffic based on data in the layer 5 to layer 7 (L5-L7) headers. For example, slice selection may be based simply on the source device by using the source network layer (e.g., IP) address, or may be based on the type of traffic and/or destination network domain by looking at the higher layer (L5-L7) headers. In some embodiments, the network slice selector integrates with other control plane components to collect additional information about a connection (e.g., regarding the user session, device type, or other data) and uses this information as part of the slice selection process (e.g., using only this collected information or combining this information with the L2-L4 and/or L5-L7 packet header data). In some embodiments, the network slice selector maintains state for mapping connections to network slices so that deep packet inspection does not need to be performed on each data message of a connection. In addition, for some connections, only certain data messages contain the L5-L7 header information required for performing the slice selection.

When performing network slice selection using deep packet inspection, in certain cases the initial data message for a connection may not include the L5-L7 header information that the slice selector needs to correctly identify the slice. For example, a connection between an endpoint device (e.g., a mobile device such as a smart phone or tablet, a laptop or desktop computer, an IoT device, a self-driving automobile, a smart camera belonging to a security system, or other device) and a network domain (e.g., a web domain such as www.netflix.com, www.google.com, etc.) often begins with a set of connection initiation messages such as a TCP handshake. After completion of the handshake, the device then sends, e.g., an http get message that includes the network domain. Subsequent data messages sent between the device and the network domain may not include such information. As such, in some embodiments the network slice selector acts as a proxy to terminate the connection initiation messages without sending these messages across the virtual service network to the intended destination until a data message is received from the endpoint device that has the higher-layer information needed to select a slice for the connection. Other embodiments initially send the connection initiation messages through to a default slice, then replay the messages over the correct network slice for the connection after the network slice is selected.

In the case of stateful slice selection, subsequent data messages are sent using the state stored by the network slice selector, both for resource/time savings and because many of the subsequent data messages do not have the information in their L5-L7 headers necessary for deep packet inspection to be useful. However, mobile devices (e.g., smart phones, tablets, self-driving automobiles) may move from one geographic range served by a first slice selector to another geographic range served by a second slice selector (e.g., when moving from one cell tower to another or when moving from a WiFi network to a cellular network) while maintaining one connection. Different embodiments use different techniques to ensure that the state is maintained, without requiring action on the part of the endpoint device.

In some embodiments, the second slice selector (the slice selector for the region to which the mobile device moves) forwards all data messages for the connection to the first slice selector (the slice selector for the region in which the mobile device was located when the connection was initiated). That is, the second slice selector receives data indicating that the first slice selector is the location of the slice mapping state for the connection, and thus forwards the data traffic for the connection to the first slice selector. In different embodiments, the first slice selector either (i) pushes this state location information directly to the second slice selector or (ii) pushes the state location information to a network controller (e.g., the aforementioned VSN controller), from which the second slice selector retrieves the state location information.

In the case that the first slice selector pushes the state location information directly to the second slice selector, in some embodiments the first slice selector pushes information about all of its slice mappings to slice selectors for neighboring geographical regions, in case mobile devices that initiate connections within the geographical region of the first slice selector move to any of the neighboring geographical regions. In other such embodiments, the first slice selector uses location data of the mobile device (if that data is made available) to push the state location information to slice selectors for neighboring geographical regions to which the device is likely to move.

In some embodiments, a virtual service network is sliced hierarchically. That is, slices of a virtual service network are themselves virtual service networks with a slice selector and multiple network slices. For example, in telecommunications networks, a mobile network operator (MNO) owns the physical infrastructure of the access and core networks (i.e., the RAN and EPC infrastructure), and traffic from devices that subscribe to that MNO are processed by that infrastructure. In addition, the MNO may lease that infrastructure to one or more mobile virtual network operators (MVNOs) that also have subscriber devices using the same infrastructure. Those MVNOs, in some cases, also lease their virtual infrastructure to additional MVNOs or other entities. In addition, hierarchical layers of slice selection can be implemented over networks for additional reasons besides different telecommunications service providers.

In the above telecommunications provider example, a first slice selector configured by the MNO might assign data messages to network slices based on the source device (e.g., by source network address). Thus, data messages from source devices associated with the MNO are sent to another virtual service network configured by the MNO, while data messages from source devices associated with different MVNOs are sent to virtual service networks configured by the respective MVNOs. In some embodiments, a second slice selector for each virtual service network performs additional slice selection based on various aspects of the data message headers. If an MVNO leases their virtual infrastructure to one or more additional MVNOs, then this second slice selector might also assign data messages to network slices based on a more fine-grained network address analysis (e.g., if the first MVNO is assigned a pool of IP addresses, and divides this pool between its own devices and devices for another MVNO). In other cases, the second level slice selector may perform stateful slice selection based on deep packet inspection, such as that mentioned above.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide methods for establishing a virtual service network across a set of datacenters. The set of datacenters across which the virtual service network is established may include, e.g., one or more public clouds, a software-defined wide area network (SD-WAN) that spans public and private clouds, a telecommunications service provider access network (e.g., spanning a combination of the radio access network, edge clouds, and core clouds), or other types of datacenters. The virtual service network of some embodiments includes multiple network slices each of which provides different network services to data messages assigned to the network slice.

In some embodiments, when a device (e.g., a mobile endpoint device in the telecommunications context) transmits a data message onto such a network, a network slice selector initially processes the data message. The network slice selector assigns the data message to one of the network slices of the virtual service network and handles service chaining operations to ensure that the data message is processed by the correct set of network services for the assigned slice. In different embodiments, this network slice selector may be implemented by a virtual machine (VM), a containerized function, a software forwarding element (e.g., a flow-based forwarding element) operating within a VM, within a container or within virtualization software of a host computer, a set of modules executing outside of a forwarding element (e.g., between a VM and a port of a forwarding element) within virtualization software of a host computer, a hardware forwarding element (e.g., a programmable switch), or other implementations.

In some cases, many network slice selectors are configured to implement a virtual service network. In the telecommunications service provider example, some embodiments configure a network slice selector for each cellular tower, base station, or other aspect of the access network. The telecommunications service provider access network of some embodiments includes edge clouds for each cellular tower, and configures at least one network slice selector at each such edge cloud. In other examples (e.g., for SD-WAN traffic entirely contained within a set of connected datacenters), distributed network slice selectors are configured such that the network slice selection for a data message sent from a VM occurs at the same host computer as the source of the data message (though outside of the source VM) or at a designated device (e.g., a specific nearby switch or router, a dedicated VM or container).

Figure 1:
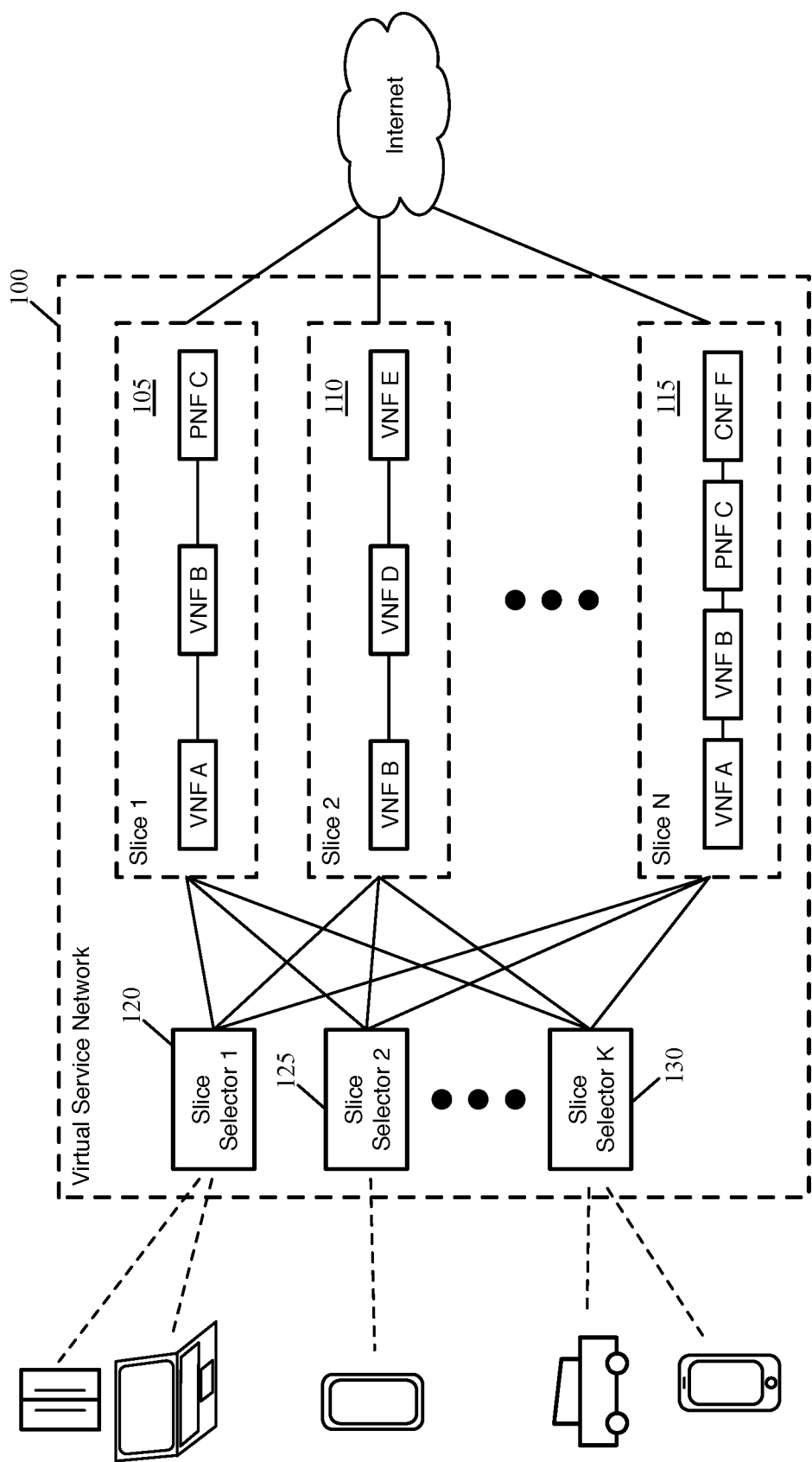
FIG. 1 conceptually illustrates a virtual service network (VSN) with multiple network slice selectors.

FIG. 1 conceptually illustrates such a virtual service network (VSN) 100 with multiple network slice selectors. In this case, the VSN 100 performs network services on data messages for devices accessing the Internet (e.g., within a telecommunications service provider access network). Which network services the VSN performs on a given data message is dependent on the slice to which the data message is assigned. In different embodiments, the network services of a given network slice may be implemented in a single data center or a combination of datacenters. For a given slice some of the network services might be distributed into many edge clouds while later network services are implemented in a central public datacenter.

As shown, the virtual service network 100 includes numerous (N) network slices 105-115. Each of these network slices represents a network service path (i.e., an ordered set of network services performed on data messages assigned to the slice). These network services can include firewalls, load balancers, network address translation, metering (e.g., for billing purposes) functions, VPN gateways, radio access network (RAN) functions (e.g., distributed unit and centralized unit functions), evolved packet core (EPC) functions (e.g., home subscriber server, serving gateway, packet data network gateway, mobility management entity), or other types of network functions.

In different embodiments, the network slices of a virtual service network may serve different purposes. Some embodiments slice a network based on the source device (e.g., using the source network address or information identifying the type of device) or subscriber information (e.g., by interfacing with authentication, authorization, and accounting systems or policy systems), while other embodiments slice a network based on the type of traffic (e.g., by performing deep packet inspection). Each network slice can have a prescribed quality of service (QoS) service-level agreement (SLA). For example, a network slice for self-driving automobiles might have extremely low latency requirements, a network slice for streaming video might have high bandwidth requirements, and an IoT slice might have less strict bandwidth or latency requirements for a single device but have a massive connectivity expectation.

These network services may be implemented as virtualized network functions (VNFs), physical network functions (PNFs), and/or cloud native network functions (CNFs) in different embodiments. VNFs are network services that are implemented in virtualized data compute nodes, such as virtual machines. This enables, for instance, the same network service configuration for a particular slice to be implemented in numerous edge clouds (e.g., along with the numerous slice selectors). CNFs are network services implemented in cloud-native data compute nodes, such as specific types of containers. Lastly, PNFs are network services implemented by a physical device (e.g., a specific firewall or load balancer device). In general, PNFs are more usefully located in centralized datacenters rather than edge clouds, so that the same physical device does not need to be replicated for each edge cloud.

In this example, the first network slice 105 includes two VNFs A and B as well as a PNF C. The second network slice 110 is entirely virtual, with three VNFs B, D, and E. The last network slice 115 includes the same three network services as slice 105 (VNFs A and B as well as PNF C) followed by a CNF F. In some embodiments, the same VM can implement a VNF for multiple different network slices. In this example, one VM might implement the same VNF B for all three of the illustrated network slices 105-115. If this VNF is located within the edge clouds, then a single VM may be instantiated in each edge cloud (e.g., for each slice selector). In other embodiments, however, a separate VNF (e.g., a separate VM or other data compute node) is instantiated for each VNF, even if the VNF configuration is the same for multiple slices. Thus, in this example, three different VNFs are instantiated for VNF B for each of the slices 105-115. Thus, if this VNF is located within the edge clouds, then each edge cloud would have three different VMs for VNF B.

Because of the manner in which devices access the network 100, some embodiments have numerous slice selectors 120-130. Devices may access a telecommunications service provider network through base stations (e.g., cell towers), wireless access points, wired hookups (e.g., within a home), or other means. For provider networks, the slice selectors of some embodiments are implemented close to the devices, so that the slice selection can occur before data traffic crosses most of the network. For instance, in the case of 5G wireless networks with multi-access edge computing, some embodiments configure a slice selector for each distributed unit (DU). Other embodiments configure a slice selector for each centralized unit (CU), which receives traffic from multiple DUs. In this case, each slice selector has an associated geographic range (i.e., that of its associated DU or CU).

In such situations, such as that shown in FIG. 1, each slice selector 120-130 is configured to perform the same slice selection function (i.e., they operate as a single logical slice selector) in some embodiments. That is, each slice selector 1-K can assign a data message to any of the slices 1-N, and the network slice assignment will be the same irrespective of which of the slice selectors 120-130 processes the data message. In other embodiments, slices are accessible only in certain specific geographical regions. For instance, a network slice associated with a specific application might be available in certain cities or other geographical areas in certain cases.

This example shows that multiple devices can attach to a given slice selector at any particular time. In the example, a smart refrigerator and a laptop are attached to the first slice selector 120, a tablet device is attached to the second slice selector 125, and an autonomous car and a mobile phone are attached to the last slice selector 130. In different embodiments, the network slice selectors may be implemented by a virtual machine (VM), a software forwarding element (e.g., a flow-based forwarding element) operating within a VM or within virtualization software of a host computer, a set of modules executing outside of a forwarding element (e.g., between a VM and a port of a forwarding element) within virtualization software of a host computer, a physical device (e.g., a dedicated hardware forwarding element, a physical host computer), a container application (e.g., a Kubernetes system running a network service mesh), or other implementations.

Figure 2:
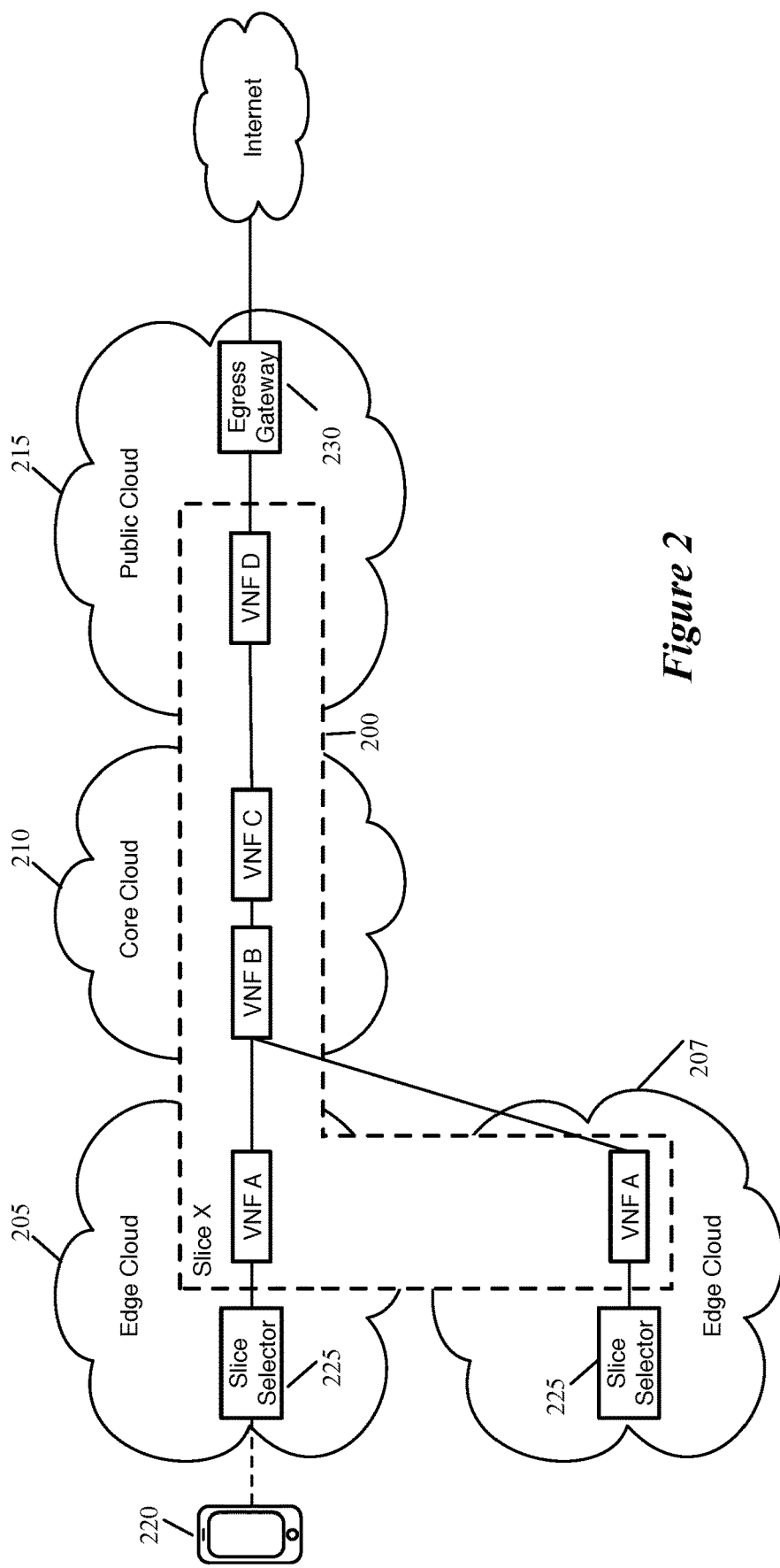
FIG. 2 conceptually illustrates the distribution of the services for a single network slice over multiple datacenters.

FIG. 2 conceptually illustrates the distribution of the services for a single network slice 200 over multiple datacenters 205-215. As shown, in this example, the network slice 200 includes four network services (VNFs A-D), which are applied to certain data traffic from the device 220 that is assigned to the network slice 200. The first VNF A is implemented in the edge clouds 205 and 207, the second and third VNFs B and C are implemented in the core cloud 210, and the fourth VNF D is implemented in a public cloud 215. In a network (e.g., a 5G network) that uses multi-access edge computing, the slice selector 225 and any network services that are implemented in the edge cloud are instantiated in each edge cloud. As such, both the edge cloud 205 and the edge cloud 207 each have instances of the slice selector 225 and the VNF A (as well as any network services implemented on the edge for any other slices of the same VSN or any other VSNs implemented across the network). In addition, though not shown, within each edge cloud some embodiments execute multiple slice selectors for high availability reasons (e.g., an active slice selector and a standby slice selector, or multiple active slice selectors to share the load of processing all incoming traffic).

In some embodiments, traffic from the device 220 initially passes through the radio access network (RAN), which is not shown in this figure. Some embodiments implement network slicing prior to the RAN (i.e., on the device side of the RAN), while in this example network slicing occurs after the RAN. Next, the data traffic arrives at the slice selector 225 (in the edge cloud 205), which analyzes the traffic and assigns the traffic to the network slice 200.

When the slice selector 225 assigns a data message to the network slice 200, the slice selector 225 is responsible in some embodiments for performing service chaining to ensure that the data message traverses the network services of the assigned slice (i.e., the VNFs A-D) in the correct order. In some embodiments, the slice selector 225 transmits the data message to the first network service (i.e., the VM that implements VNF A in the same edge cloud 205) and maintains context information for that data message. When VNF A completes its processing of the data message, the VNF returns the data message to the slice selector 225. If additional network services for the slice are also implemented in the edge cloud 225 (which is not the case for the slice 200), then the slice selector 225 would use the maintained context information to transmit the data message to the next network service, and so on.

In this case, the second network service VNF B is implemented in the core cloud 210. In some embodiments, the network slice selector 225 transmits the data message to a service chaining module at the core cloud (e.g., via wide area network (WAN) gateways that interconnect the clouds 205-215). In some embodiments, when the full network slice is implemented across multiple datacenters, a similar service chaining module operates at each datacenter to handle the service chaining for the slice within its own datacenter (e.g., in both the core cloud 210 and the public cloud 215). These service chaining modules may be implemented in the same manner as the network slice selectors in some embodiments (e.g., as VMs, as forwarding elements in VMs or virtualization software, as containers). Once the last network service is completed, in some embodiments an egress gateway 230 sends the data message to its destination via the Internet.

Figure 3:
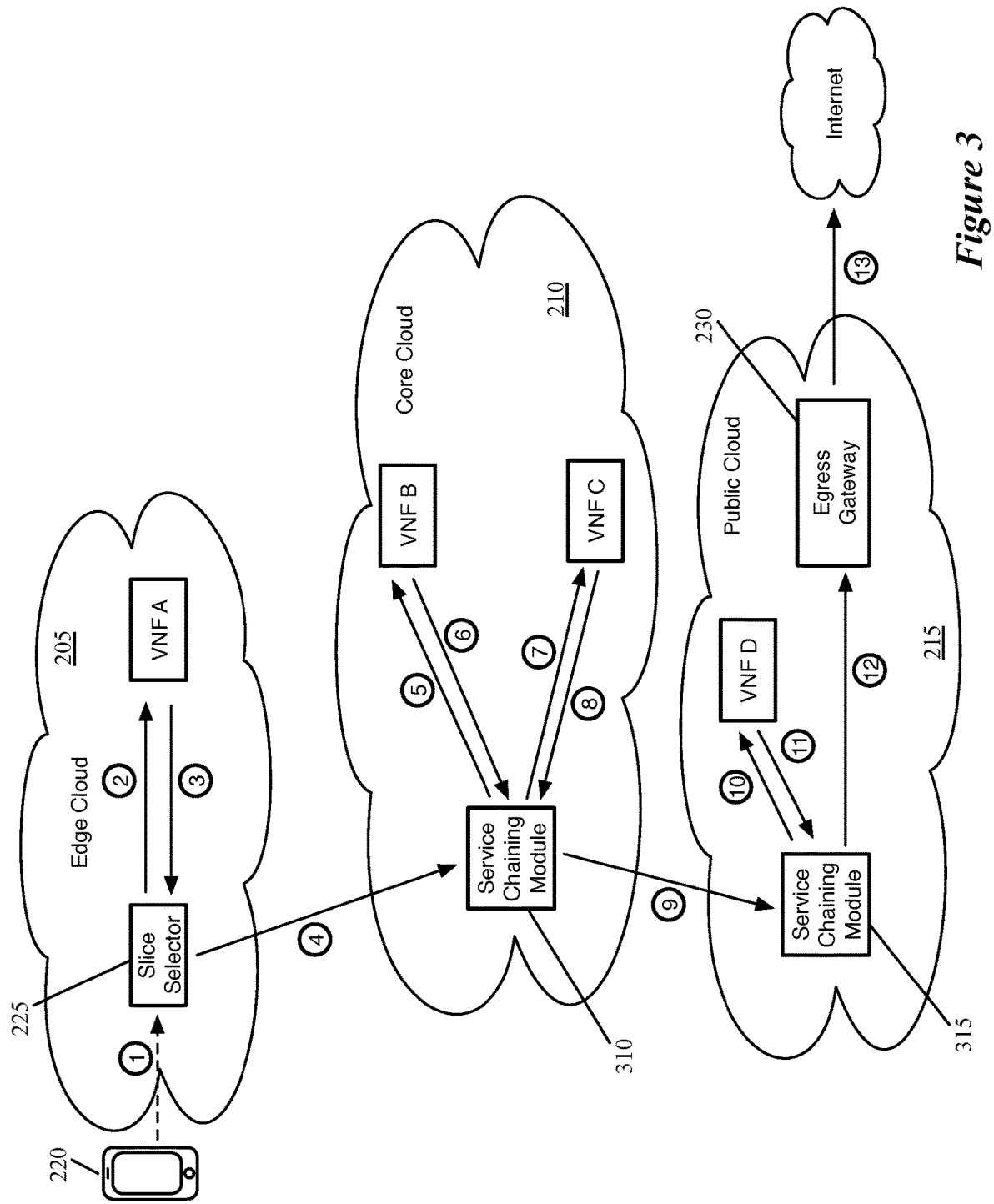
FIG. 3 conceptually illustrates the path a data message that is received at an edge cloud and assigned to the network slice shown in FIG. 2 by the slice selector at the edge cloud takes through the VSN according to some embodiments.

FIG. 3 conceptually illustrates this path that a data message received at the edge cloud 205 and assigned to the slice 200 by the slice selector 225 at that edge cloud takes through the VSN according to some embodiments. As shown by the encircled 1, the endpoint device 220 transmits a data message to the telecommunications provider access network, where it is processed by the slice selector 225 at the edge cloud 205. In some embodiments, the data message is initially processed by the RAN and/or EPC, if these portions of the access network are not part of the virtual service network (i.e., if the slice selector processes data messages after the RAN and/or EPC). The slice selector 225 in the edge cloud 205 assigns the data message to the slice 200 (e.g., based on deep packet inspection, L2-L4 headers, or other factors), and identifies that VNF A is (i) the first network service for this slice and (ii) also located in the edge cloud 205. As such, the slice selector 225 transmits the data message to VNF A (shown by the encircled 2), which processes the data message and returns it to the slice selector 225 (shown by the encircled 3).

Next, the slice selector 225 identifies that the next network service for the selected slice 200 is located in the core cloud 210, and thus transmits the data message to the service chaining module 310 that operates in the core cloud 210 (shown by the encircled 4) via WAN gateways (that are not shown in the figure for simplicity). In some embodiments, the service chaining module 310 uses a learning operation (e.g., MAC learning) to store the source of these data messages, so that reverse-direction traffic is sent to the slice selector 225 in the correct edge cloud 205 (i.e., as opposed to the edge cloud 207).

The service chaining module 310 in the core cloud 210 receives the data message as the data message ingresses to the core cloud 210 (after processing by a WAN gateway) and identifies the slice for the data message (e.g., based on context information provided with the data message by the slice selector 310, a stored slice mapping for the connection, or other factors). This service chaining module 310 provides the data message to the network services within the core cloud 210, in this case to VNF B and then to VNF C. As shown, the service chaining module sends the data message to VNF B (shown by the encircled 5), receives the data message back from VNF B (shown by the encircled 6), sends the message to VNF C (shown by the encircled 7), and receives the data message back from VNF C (shown by the encircled 8).

After the data message is processed by VNF C, the data message is transmitted by the service chaining module 310 to another service chaining module 315 (shown by the encircled 9) in the public cloud 215 (e.g., via WAN gateways interconnecting the core cloud 210 and the public cloud 215). The service chaining module 310 operates similarly to the service chaining module 310 in the core cloud 210 in some embodiments, using a learning mechanism to store information for processing return traffic. This service chaining module 310 within the public cloud 215 sends the data message to VNF D (shown by the encircled 10), which performs its network service and returns the data message to the service chaining module 315.

Lastly, the service chaining module 315 determines that the network slice processing is complete for the data message, and sends it to the egress gateway 230, which transmits the data message to its destination via the Internet. While this example shows connectivity between an endpoint device and an Internet domain, in the case of other virtual service networks the destination may instead be located within the public cloud or another datacenter connected via the WAN. The egress gateway 230 of some embodiments stores information mapping the connection to the network slice 200, so that reverse-direction traffic (i.e., data messages from the public Internet domain) are assigned to the same slice (with the network functions performed in the reverse direction). In other embodiments, the egress gateway 230 assigns data messages in a non-stateful manner (e.g., using the destination network address of the data messages). The egress gateway may be implemented together with the service chaining module in some embodiments (or with the original slice selector for virtual service networks that only span a single datacenter).

The slice selectors, network services (e.g., VNFs, CNFs, PNFs), as well as the various forwarding elements that handle transmission of data messages between these entities (e.g., software forwarding elements that tunnel data messages between host machines, WAN gateways) require configuration. In some embodiments, a centralized controller allows a user (e.g., a network administrator) to provide configuration for an entire VSN, and then a controller hierarchy configures the various entities within the one or more datacenters to implement this VSN.

Figure 4:
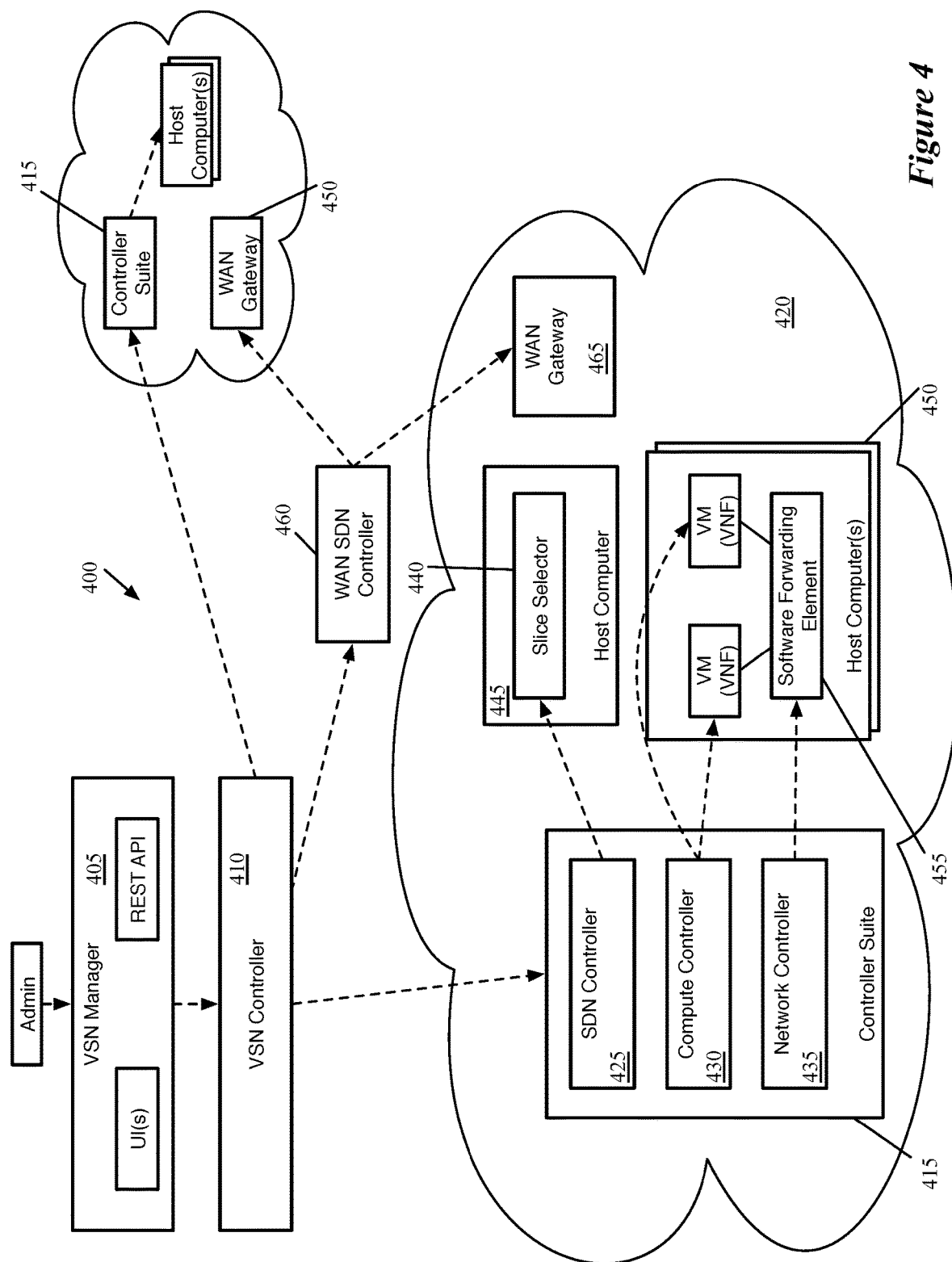
FIG. 4 conceptually illustrates a hierarchical set of controllers.

FIG. 4 conceptually illustrates such a hierarchical set of controllers 400. As shown in this figure, a high-level VSN manager 405 receives a VSN configuration from a network administrator (e.g., for a datacenter tenant, a telecommunications provider). The VSN manager 405 of some embodiments provides one or more interfaces (e.g., a graphical user interface, a command line interface, a set of REST APIs) through which the administrator provides this data. In some embodiments, the configuration data for a VSN specifies the different slices of the VSN, the slice selector configuration (i.e., the characteristics for assigning data messages to each of the different slices), the network service configurations for each network service on a slice, how each network services will be implemented (e.g., as VNFs, CNFs, or PNFs), the locations (e.g., edge clouds, core clouds, or other datacenters) for each network service, and/or other data.

The VSN controller 410 coordinates the centralized storage and distribution of this information to the other controllers in the hierarchy. In some embodiments, a suite of controllers 415 in each of the datacenters receives the VSN configuration data from the VSN controller 410 and configures the entities in the datacenters to implement the VSN. In some embodiments, each datacenter has its own suite of these lower-level controllers. These controller suites may be the same sets of controllers in each datacenter (e.g., a suite of controllers provided by a single company), or different sets of controllers (e.g., a different set of controllers for private edge and core clouds as compared to the public clouds).

The controller suite 415 in the first datacenter 420 includes a software-defined networking (SDN) controller 425, a compute controller 430, and a network controller 435. It should be understood that different embodiments may include additional controllers or may combine the functionality of multiple controllers into a single controller. For instance, some embodiments include an orchestrator that acts as a layer between the VSN controller 410 and the other controllers in the controller suite 415 (e.g., an openstack controller), or combine the SDN controller 425 features with those of the network controller 435. In addition, some embodiments include a storage controller for managing storage relevant to the VSN within the datacenter.

The SDN controller 425 configures the slice selector 440. In this example, a single slice selector 440 operates in the datacenter 420 (e.g., as a VM or within a VM on the host computer 445, in virtualization software of the host computer 445), though it should be understood that in other embodiments the slice selector 440 is implemented in a distributed manner within the datacenter. In some embodiments, the SDN controller 425 configures the slice selector with flow entries or other configuration data to assign data messages to the flows correctly and to perform service chaining operations to ensure that data messages are sent to the correct network services in the correct order within the datacenter 420. In addition, in datacenters that host network services but not the slice selectors (e.g., core clouds, public and/or private clouds for the telecommunications provider example), the SDN controllers of some embodiments configure the service chaining modules as well as the egress gateways (which may perform slice selection for reverse-direction data messages).

The compute controller 430 is responsible for instantiating and configuring the VNFs (e.g., as VMs in this example). In some embodiments, the VMs are instantiated on host computers 450 by the compute controller 430, which configures the VMs to implement the specified network service. In some embodiments, the compute controller 430 uses templates for firewalls, load balancers, or other network services for instantiating the VMs, then provides the specific configuration data for the network service as specified by the network administrator to the VM. In addition, the compute controller 430 of some embodiments is also responsible for configuring any CNFs and/or PNFs implemented in the datacenter 420.

The network controller 435 configures forwarding elements (e.g., the software forwarding element 455 or other types of forwarding elements such as programmable hardware forwarding elements) to implement the network connectivity between the network services and the slice selector 440. This configuration includes forwarding according to, e.g., a logical forwarding plane that connects the various entities of a slice (the slice selector and the network services), as well as performing encapsulation on data messages to tunnel those data messages between the entities within the datacenter. In addition to the software forwarding elements 455 (e.g., virtual switches operating in virtualization software) shown on the host computers 450, in some embodiments a similar software forwarding element executes in the host computer 445 to forward and encapsulate/decapsulate data messages to and from the slice selector 440. In some embodiments (e.g., when the slice selector is implemented in a distributed manner within the software forwarding elements or between the software forwarding elements and the VMs), the network controller 435 also receives the slice selector configuration and configures the appropriate network entities to implement the slice selector.

In addition to these controllers in the controller suite 415, some embodiments also include one or more WAN SDN controllers 460. The WAN SDN controller 460 is responsible for interconnecting the datacenters as needed, and configures WAN gateways 465 in each of the datacenters to do so. These WAN gateways may interconnect the datacenters using MPLS, SD-WAN, or other technologies for inter-datacenter communications. In many cases, not all of the datacenters will need direct communication. For instance, in the telecommunications example, the edge clouds may not need to communicate with each other, as data traffic is not sent between edge clouds but rather between an edge cloud and a core cloud.

In some embodiments, rather than communicating directly with the controllers in the controller suite 415 and the WAN SDN controller 460, the VSN controller 410 provides data to an agent in each datacenter and an agent for the WAN SDN controller 460. These agents are responsible for translating data from the VSN controller 410 (which may be provided in a uniform format for all controllers) into data that the various controller suites can use. In some embodiments, the VSN controller 410 pushes data in a policy format to the local agents, which translate this into data that instructs the various SDN controllers, compute controllers, and/or network controllers, to configure the datacenter components according to those policies. This allows the VSN controller 410 to use a single format to communicate with various different types of controller suites (e.g., different public cloud controllers, enterprise datacenter controller suites). Similarly, for the WAN SDN controller 460, the agent would convert the policies into WAN configuration instructions.

As mentioned above, network slice selectors may assign data messages to slices using different techniques in different embodiments. Slice selection may be based on packet header information, including layer 2 to layer 4 (L2-L4) headers and/or by performing deep packet inspection (e.g., to classify traffic based on data in the layer 5 to layer 7 (L5-L7) headers). For example, slice selection may be based simply on the source device by using the source network layer (e.g., IP) address, or may be based on the type of traffic and/or destination network domain by looking at the upper layer (L5-L7) headers.

In addition, in some embodiments the network slice selector integrates with other control plane components to collect additional information about a connection (e.g., regarding the user session, device type, or other data) and uses this information as part of the slice selection process (e.g., using only this collected information or combining this information with the L2-L4 and/or L5-L7 packet header data). Examples of such control plane components include Authentication, Authorization, and Accounting (AAA) protocols (e.g., Remote Authentication Dial-in User Service (RADIUS)), the Policy Control and Charging Rules Function (PCRF), or other such components that can provide device and/or user data to the slice selector.

In some embodiments, the network slice selector maintains state for mapping connections to network slices so that deep packet inspection does not need to be performed on each data message of a connection. In addition, for some connections, only certain data messages contain the L5-L7 header information required for performing the slice selection.

When performing network slice selection using deep packet inspection, in certain cases the initial data message for a connection may not include the L5-L7 header information that the slice selector needs to correctly identify the slice. For example, a connection between an endpoint device (e.g., a mobile device such as a smart phone or tablet, a laptop or desktop computer, an IoT device, a self-driving automobile, a smart camera belonging to a security system) and a network domain (e.g., a web domain such as www.netflix.com, www.google.com, etc.) often begins with a set of connection initiation messages such as a TCP handshake. After completion of the handshake, the device then sends, e.g., an http get message that includes the network domain. Subsequent data messages sent between the device and the network domain may not include such information.

Different embodiments use different techniques to identify the correct network slice for a connection while ensuring that (i) the connection is initiated correctly between the client (e.g., an endpoint device) and server (e.g., a web domain) and (ii) all of the messages are transmitted on the correct network slice, even if that network slice cannot be selected based on the first message. In some embodiments, the network slice selector acts as a proxy to terminate the connection initiation messages without sending these messages across the virtual service network to the intended destination. In other embodiments, the slice selector passes the connection initiation messages through to a default network slice initially, then replays the messages over the correct network slice for the connection after the network slice is selected.

This stateful slice selection, in which an initial data message is inspected to select a network slice for a connection and subsequent data messages are assigned to the network slice based on state stored by the slice selector, works so long as the same slice selector (and egress gateway) process all of the data traffic for a connection. However, in a distributed network (e.g., a telecommunications service provider access network) with numerous slice selectors associated with different geographic ranges, mobile devices (e.g., smart phones, tablets, self-driving automobiles) may move from one geographic range served by a first slice selector to another geographic range served by a second slice selector (e.g., when moving from one base station to another, between groups of base stations that provide traffic to the same centralized unit, when moving from a WiFi network to a cellular network) while maintaining a connection. Different embodiments use different techniques to ensure that the state is maintained, without requiring action on the part of the endpoint device.

In some embodiments, the second slice selector (the slice selector for the region to which the mobile device moves) forwards all data messages for the connection to the first slice selector (the slice selector for the region in which the mobile device was located when the connection was initiated). That is, the second slice selector receives data indicating that the first slice selector is the location of the slice mapping state for the connection, and thus forwards the data traffic for the connection to the first slice selector.

Figure 5:
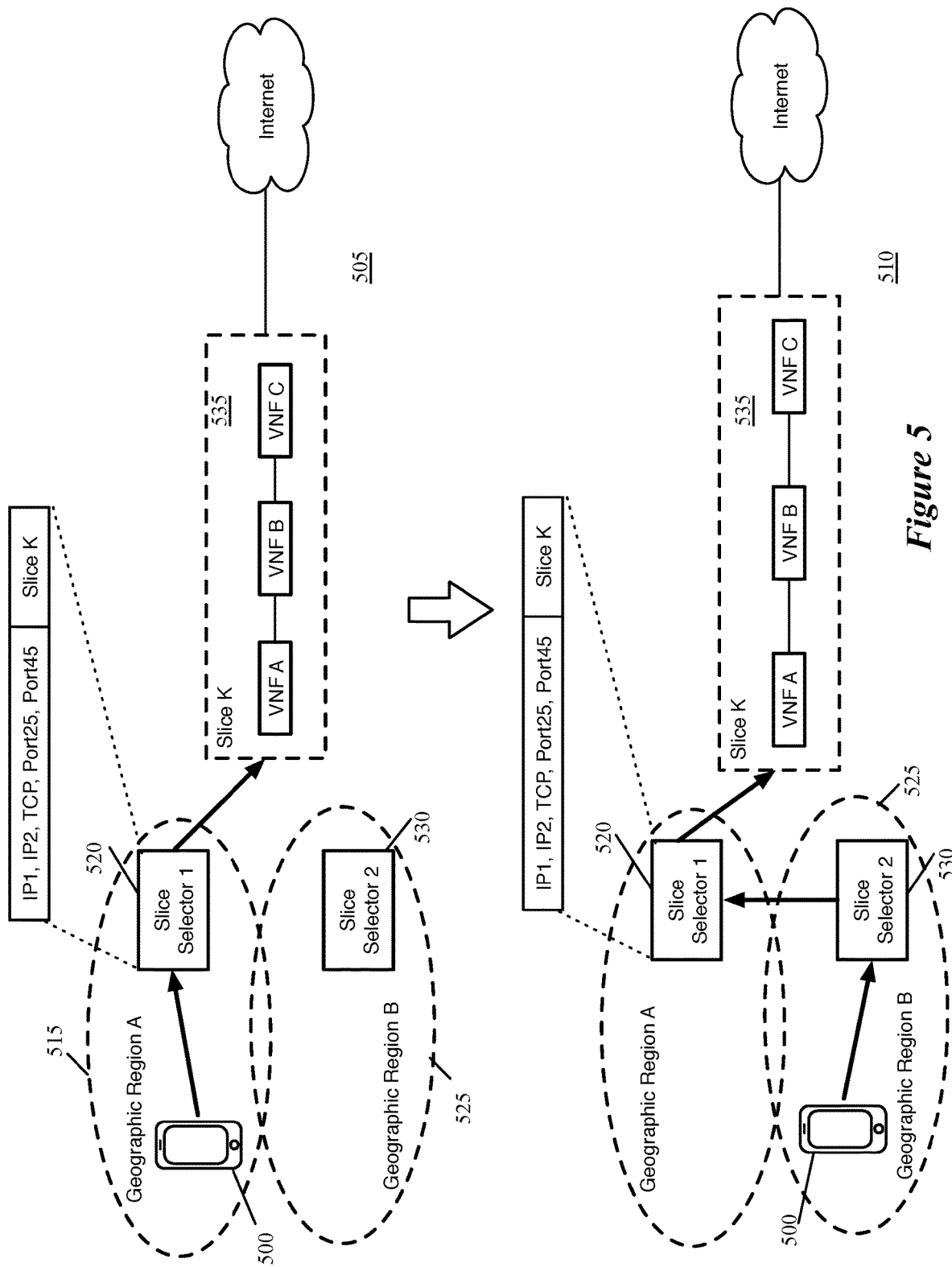
FIG. 5 conceptually illustrates a mobile device moving from a first slice selector region to a second slice selector region with the second slice selector forwarding data traffic from the mobile device to the first slice selector.

FIG. 5 conceptually illustrates a mobile device 500 moving from a first slice selector region to a second slice selector region with the second slice selector forwarding data traffic from the mobile device 500 to the first slice selector over two stages 505-510. As shown in the first stage 505, the mobile device 500 initiates a connection with a public network destination (not shown) while located in a first geographic region 515 served by a first slice selector 520. A neighboring (and in some cases, partially overlapping) geographic region 525 is served by a second slice selector 530. In some embodiments, each slice selector is located in an edge cloud that corresponds to a 5G centralized unit (CU), which encompasses multiple distributed unit (DU) ranges (i.e., multiple cell towers).

When the mobile device 500 initiates a connection (which may be only one of multiple connections initiated by the device (e.g., in a single PDU session)), the first slice selector 520 assigns the connection to the slice 535, one of several slices of a virtual service network implemented over the access network. As shown, the network slice 535 includes three VNFs A-C before transmitting data through an egress gateway (not shown) to the Internet. The first slice selector 520, after performing deep packet inspection to select the network slice, stores state data mapping the connection (in this case, a TCP connection between IP1 and IP2) to the selected network slice. As mentioned above, this state data may be stored as a flow entry (or set of flow entries), as an entry in a connection table, or in another manner. For subsequent traffic from the mobile device 500 that belongs to this connection, the slice selector 520 assigns the traffic to the selected network slice 535 (other connections from the device 500 may be assigned to other slices). Return traffic for the connection is received from the Internet at the egress gateway, which uses similar stored state to assign this traffic to the same network slice 535. This return traffic is processed by the VNFs of the network slice 535 in the reverse order, and then sent from the slice selector 500 to the mobile device 500.

In the second stage, however, the mobile device 500 has moved to the second geographic region 525, and thus no longer connects to the first slice selector 520 (i.e., the mobile device 500 is connected to a different base station that provides traffic to the second slice selector 530 rather than the first slice selector 520). The second slice selector 530 does not have the connection-to-slice mapping state to assign this data traffic from the device 500 to the correct network slice, and in many cases the data messages will not include the necessary data in the L5-L7 headers for the slice selector 530 to assign the connection to the network slice. As such, the second slice selector 530 forwards this traffic to the first slice selector 520, which uses its stored state information to assign the traffic to the selected network slice 535. New connections started by the device 500 while in the second geographic region 525 will be assigned to the correct slice by the second slice selector 530.

For the second slice selector 530 to transmit the data traffic to the first slice selector 520, in some embodiments the second slice selector 530 sends the packet via a routable network between the two slice selectors. That is, in such embodiments a routable network exists between the two edge clouds at which the slice selectors are implemented, which can be used to transmit data traffic between the two slice selectors. In other embodiments, the data traffic can be sent through a core cloud (if the two edge clouds connect to the same core cloud) or other WAN connection, or through the VSN controller (though this solution is not optimal if a large amount of traffic is transmitted between slice selectors).

Reverse-direction (return) traffic for the ongoing connection is treated differently in different embodiments, because the slice selector does not need the connection state in some embodiments to process return traffic and send this return traffic to the device 500. However, in many cases, at least one of the network services is stateful and implemented in the same location (e.g., the same edge cloud) as the slice selector, and thus the return traffic needs to be sent to that edge cloud in order for the same implementation of those network services (i.e., the VM in the first edge cloud with the first slice selector 520 rather than a VM in the second edge cloud with the second slice selector 530). The first slice selector 520 then forwards this return traffic to the second slice selector 530 in order for the second slice selector 530 to forward the data to the mobile device 500 (e.g., through the RAN). In some embodiments, the service chaining module in the core cloud uses its learning function (e.g., a MAC learning feature) to automatically transmit the return traffic to the first slice selector 520 from which it received the traffic originating at the mobile device 500. In addition, in some embodiments, the first slice selector 520 uses a similar learning function when receiving traffic for the connection from the second slice selector 530, so that it automatically forwards the return traffic onto the network between the two slice selectors (which results in that traffic returning to the second slice selector 530. For instance, when there is a routable network between the two slice selectors, the first slice selector 520 stores the MAC address of the router from which it received the traffic from the second slice selector 530, so that return traffic can be forwarded to this router using the stored MAC address. Other embodiments use a separate ingress gateway function on the slice (i.e., before the first network service), that is responsible for sending return traffic to the correct slice selector In order for the second slice selector 530 to forward the data traffic for a particular connection to the first slice selector 520, the second slice selector needs to receive data indicating that the first slice selector 520 has the state information for the connection. In different embodiments, the first slice selector either (i) pushes the state location information to a network controller (e.g., the aforementioned VSN controller), from which the second slice selector retrieves the state location information or (ii) pushes the state location information to the second slice selector.

Figure 6:
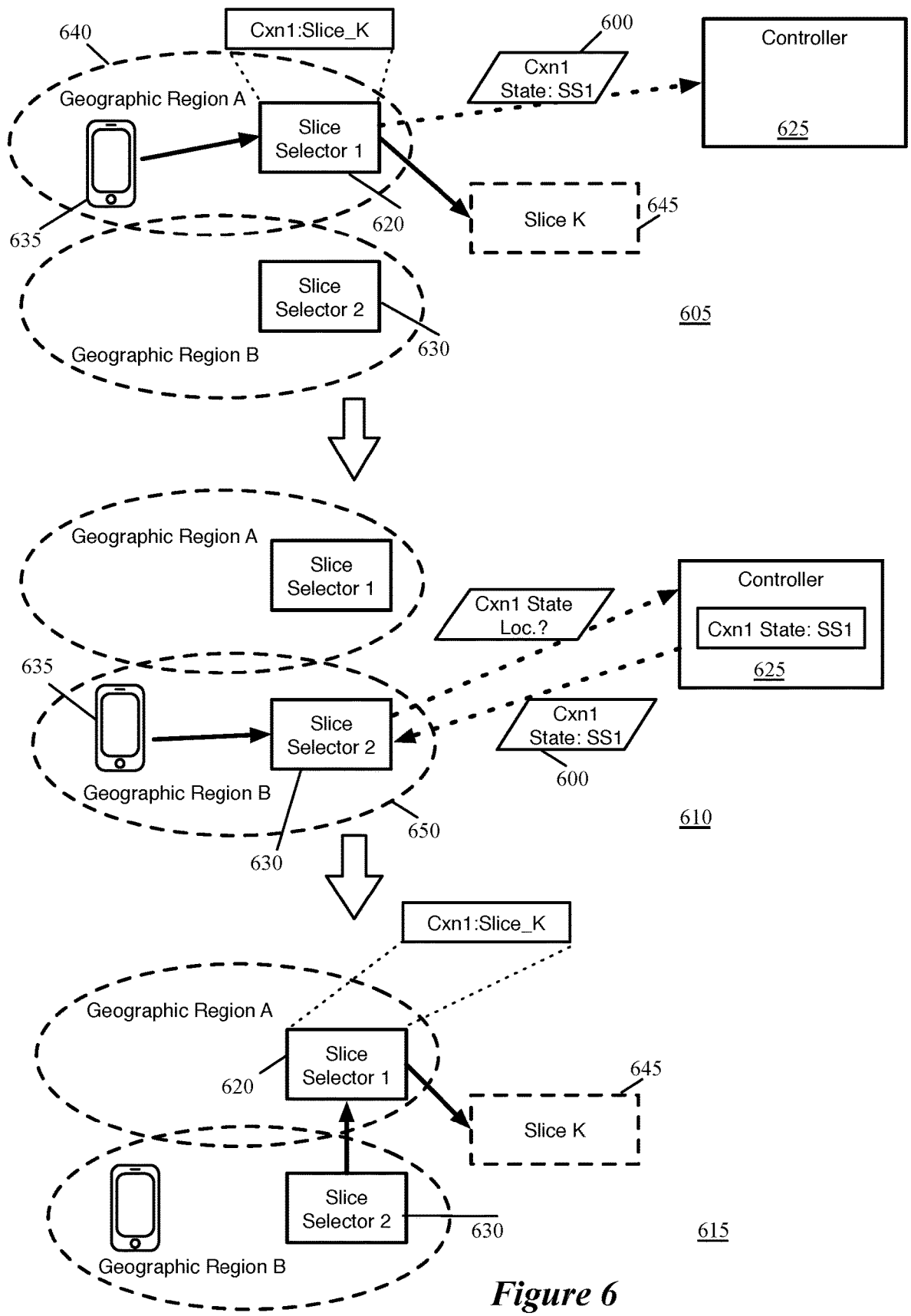
FIG. 6 conceptually illustrates an example of a first slice selector pushing state location information to a central controller and a second slice selector retrieving the state location information from the central controller.

FIG. 6 conceptually illustrates an example of a first slice selector 620 pushing state location information 600 to a central controller 625 and a second slice selector 630 retrieving the state location information from the central controller 625 over three stages 605-615. As shown in the first stage 605, like in the example of FIG. 5, a mobile device 635 initiates a connection with a public network destination while located in a first geographic region 640 associated with the first slice selector 620. The first slice selector assigns the connection to a network slice 645, forwards data traffic from the mobile device 640 belonging to this connection to this slice (i.e., to the network services of this slice), and stores connection state mapping the connection to the selected network slice.

In addition, the first slice selector 620 pushes information to the network controller 625 specifying that the first slice selector is the location of the slice mapping state for this connection. This network controller, in some embodiments, is a VSN controller that provides VSN configuration data to the controllers at multiple datacenters in which the VSN is implemented. Specifically, in some embodiments, the first slice selector 620 provides the slice mapping state location data to one of the controllers local to its datacenter (e.g., the SDN controller that configures the slice selector), which in turn passes the state location data to the VSN controller so that it can be accessed by slice selectors at other datacenters.

In the second stage 610, the mobile device 635 has moved to a second geographic range 650 associated with the second slice selector 630. Upon receiving a data message from the device 635 for an ongoing connection that the second slice selector 630 does not recognize, this slice selector 630 sends a request to the controller 625 (e.g., by making such a request to one of the controllers local to its datacenter, which in turn sends the request to the VSN controller). The controller 625 stores this state location information 600, and thus returns the information 600 to the second slice selector 630 (e.g., via the controller local to the datacenter of the second slice selector 630).

Based on this state location information, in the third stage 615, the second slice selector 630 is able to forward the data message for this connection (as well as subsequent data messages for the connection) to the first slice selector 620, which can forward the data onto the selected network slice 645. In some embodiments, datacenter-to-datacenter connections (i.e., routable networks) exist between edge clouds, while in other embodiments this traffic is passed from one slice selector to another through core clouds or other networks.

Figure 7:
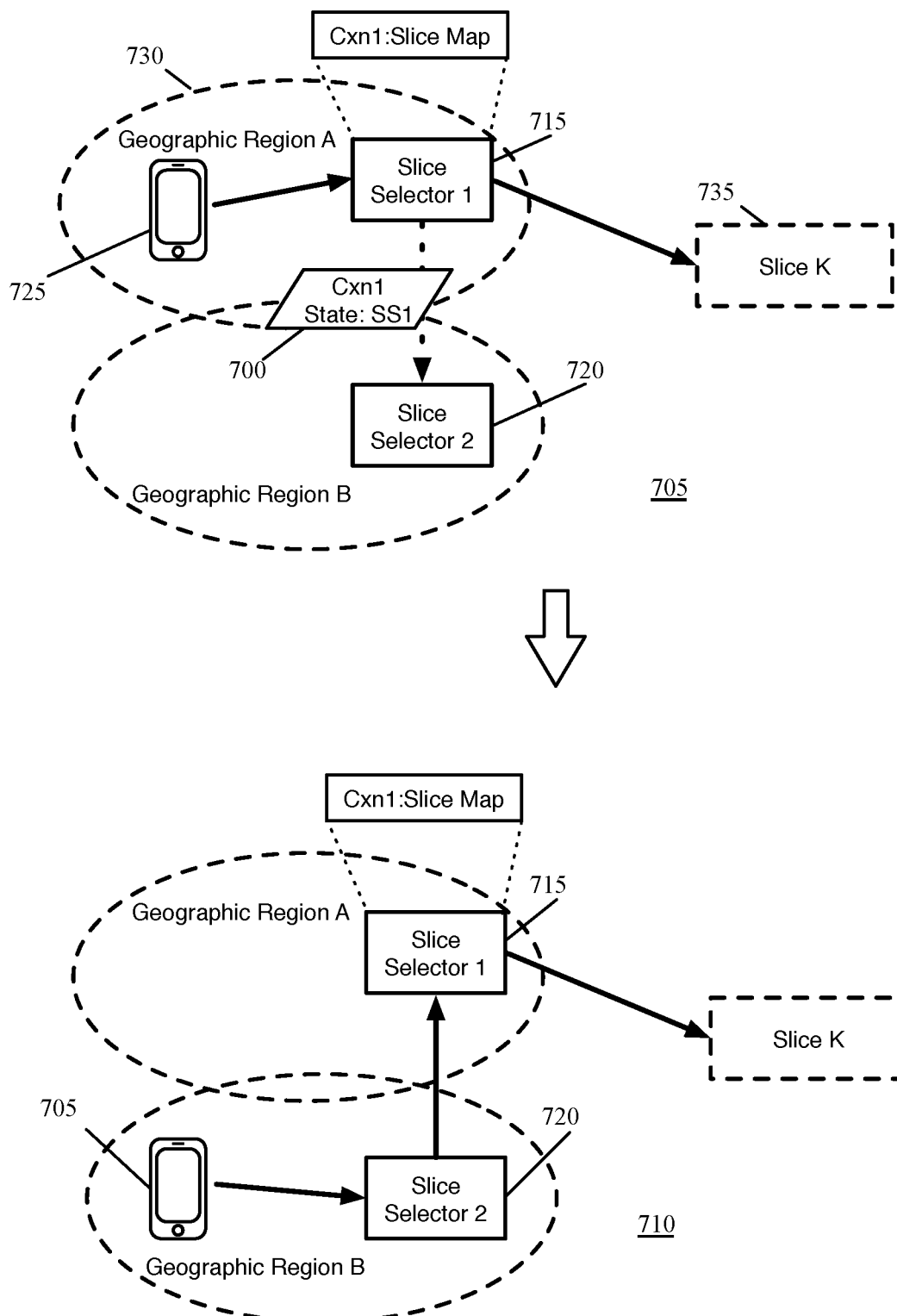
FIG. 7 conceptually illustrates an example of a first slice selector pushing state location information to a second slice selector.

In other embodiments, the slice selector through which a connection was initiated pushes the state location information to other slice selectors (e.g., geographically neighboring slice selectors) such that those other slice selectors have the state location information available if the mobile device that initiated the connection moves into a new geographic region. FIG. 7 conceptually illustrates an example of a first slice selector 715 pushing state location information 700 to a second slice selector 720 over two stages 705-710. As shown in the first stage 705, like in the example of FIG. 5, a mobile device 725 initiates a connection with a public network destination while located in a first geographic region 730 associated with the first slice selector 715. The first slice selector 715 assigns the connection to a network slice 735, forwards data traffic from the mobile device 725 belonging to this connection to this slice (i.e., to the network services of this slice), and stores connection state mapping the connection to the selected network slice.

In addition, the first slice selector 715 pushes information to the second slice selector 720 specifying that the first slice selector 715 is the location of the slice mapping state for this connection. Different embodiments transmit the state location information in different ways. In some embodiments, this information is transmitted through the data network (e.g., via a routable datacenter-to-datacenter network, through an edge cloud) as for the data traffic sent between the two slice selectors (but as control plane data between control plane interfaces of the slice selectors), while in other embodiments the state location information is pushed to a controller (i.e., as shown in FIG. 6), which in turn automatically pushes the state location information to the second slice selector 720. The state location information, in different embodiments, may be pushed to specific slice selectors with neighboring geographic ranges, to all slice selectors for a particular network (e.g., for a particular network service provider), or to other combinations of slice selectors.

In the second stage 710, the mobile device 725 has moved to a second geographic range 740 associated with the second slice selector 720. Upon receiving data traffic from the device 725 for an ongoing connection, the second slice selector 720 can map that data traffic to the state location data that it already stores and forward the data messages to the first slice selector 715, which forwards the data onto the selected network slice 735. In some embodiments, datacenter-to-datacenter connections (i.e., routable networks) exist between edge clouds, while in other embodiments this traffic is passed from one slice selector to another through core clouds or other networks.

In a number of the above examples, the first slice selector pushes the state location information to the second controller. In some embodiments, the first slice selector pushes the state location information for all of its connections to slice selectors for neighboring geographical regions, in case mobile devices that initiate connections within the geographical region of the first slice selector move to any of the neighboring geographical regions. In other such embodiments, the first slice selector uses location data of the mobile device (if that data is available) to push the state information to slice selectors for neighboring geographical regions to which the device is likely to move.

Figure 8:
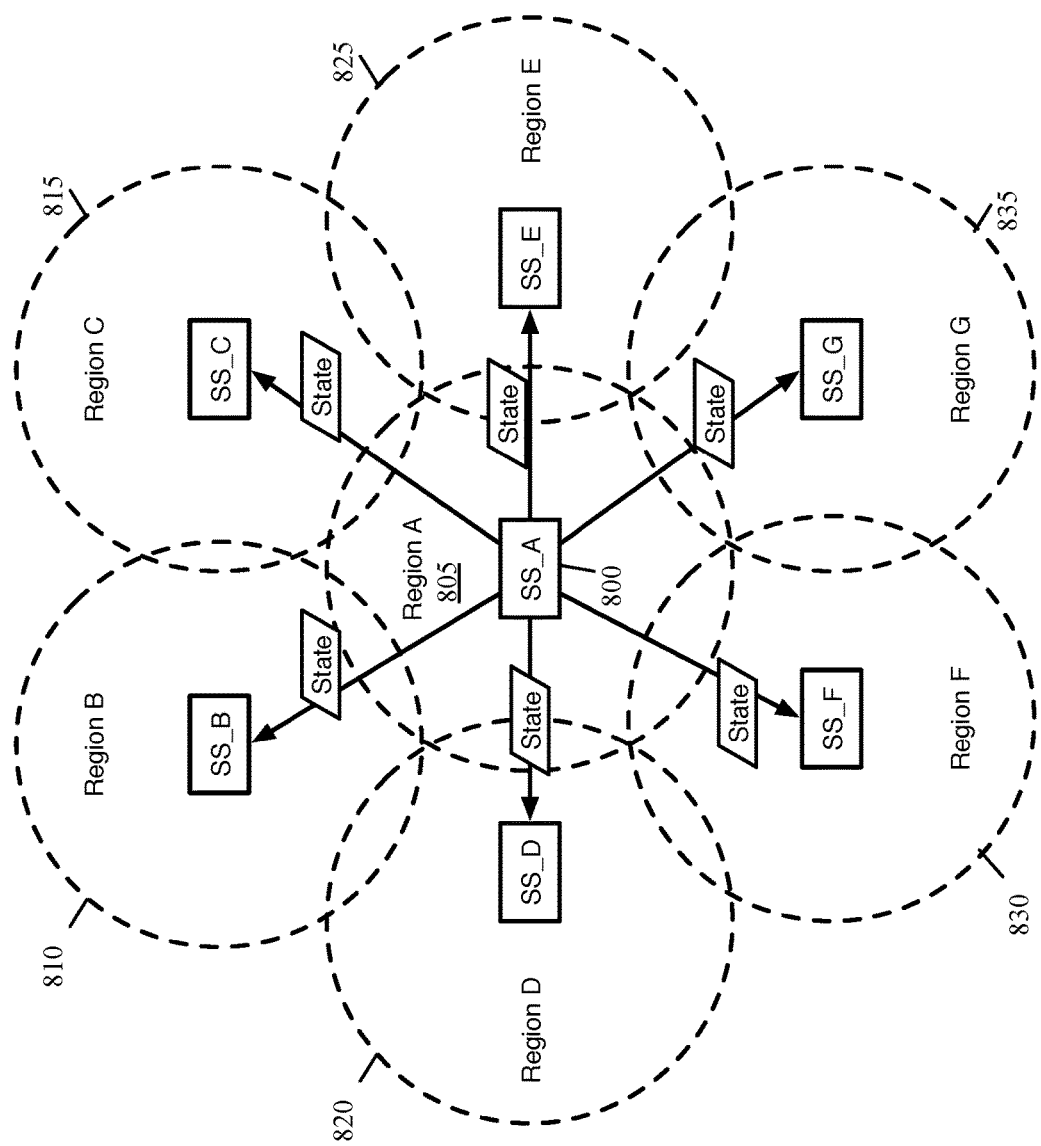
FIG. 8 conceptually illustrates a first slice selector associated with a first geographical region pushing slice mapping state to all of its neighboring geographical regions according to some embodiments.

FIG. 8 conceptually illustrates a first slice selector 800 associated with a first geographical region 805 pushing state location for a connection to all of its neighboring geographical regions according to some embodiments. In this example, the first geographical region 805 has six neighboring geographical regions 810-835. These geographical regions 805-835 are all circular and equally-sized in this example, but it should be understood that the actual geographic regions may vary in size and shape for various reasons (e.g., different slice selectors being associated with different numbers of base stations, different base stations having different associated geographic regions). When a connection is initiated by a mobile device located in the first geographic region 805, the slice selector 800 associated with this region pushes the state location for this connection to all of the slice selectors associated with the neighboring geographic regions 810-835.

Some embodiments only push the state location information to directly neighboring regions (i.e., regions that partially overlap or abut the region in which a connection is initiated), while other embodiments push the state location to additional regions (e.g., all regions, regions that neighbor all of the neighboring regions of the region in which a connection is initiated). In some embodiments, the slice selector is configured with a list of all of the regions to which it pushes state location information, and pushes this state location directly to the slice selectors for those other regions (e.g., by transmitting the information through a connection between datacenters). Once a mobile device moves to a different region and the slice selector for that region processes the data traffic for a connection from the mobile device using the slice mapping state, in some embodiments the slice selector for the new region also pushes the state location to the slice selectors for its neighboring regions, in case the mobile device continues to move.

The slice selectors of other embodiments push the state location to a central controller (e.g., the VSN controller) that automatically distributes the state location to the slice selectors for neighboring regions, in which case the slice selector does not need to be configured with a list of slice selectors to which to push its state location, as this is handled at the controller.

Figure 9:
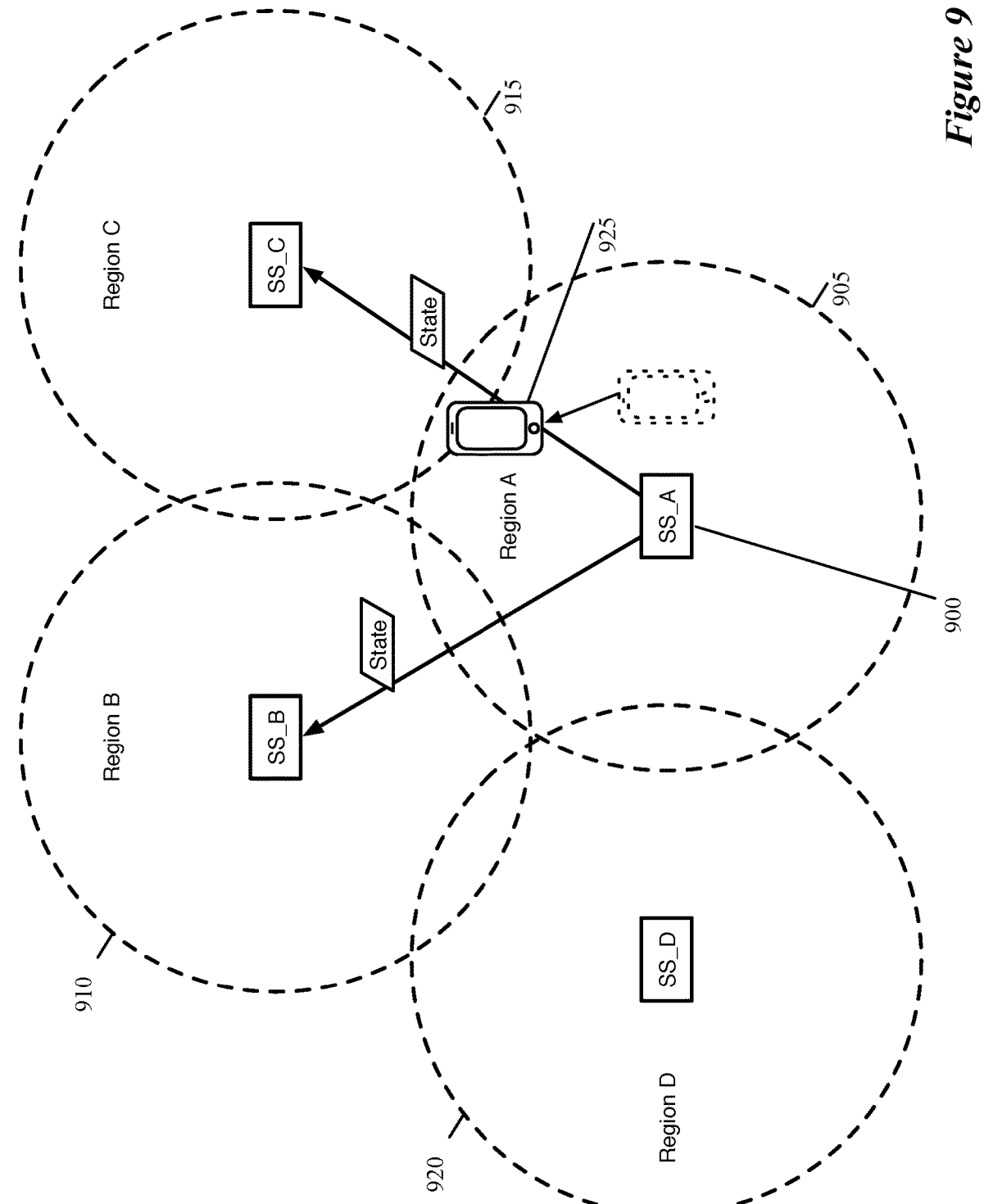
FIG. 9 conceptually illustrates a mobile device moving within a first geographic region and the slice selector for that region pushing slice mapping state for a connection initiated by the mobile device to only the neighboring regions towards which the device is moving.

As mentioned, some embodiments use more precise location data for a mobile device to intelligently push state location information to specific neighboring regions. FIG. 9 conceptually illustrates a mobile device 925 moving within a first geographic region 905 and the slice selector 900 for that region pushing state location information for a connection initiated by the mobile device to only the neighboring regions towards which the device 925 is moving. As shown in the figure, the mobile device 925 has moved from closer to the center of the region 905 to a position in which it is near the overlap of region 905 and its neighboring region 915. In addition, the vector of movement for the mobile device indicates that the device may move into region 910 soon. As such, based on this device location information, the first slice selector 900 pushes the state location information for any connections initiated by the mobile device 925 to the slice selectors for regions 910 and 915 (but not the slice selector for its other illustrated neighboring region 920). Different embodiments may use different heuristics as to when to push the state location information to a particular neighboring region (e.g., using absolute device location within a threshold distance of the neighboring region, using a direction vector indicating movement towards the neighboring region, or other heuristics).

All of the above examples illustrate a single virtual service network implemented over a physical infrastructure (e.g., a telecommunications service provider access network). In some embodiments, however, a virtual service network is sliced hierarchically. That is, slices of a virtual service network are themselves virtual service networks with a slice selector and multiple network slices.

Figure 10:
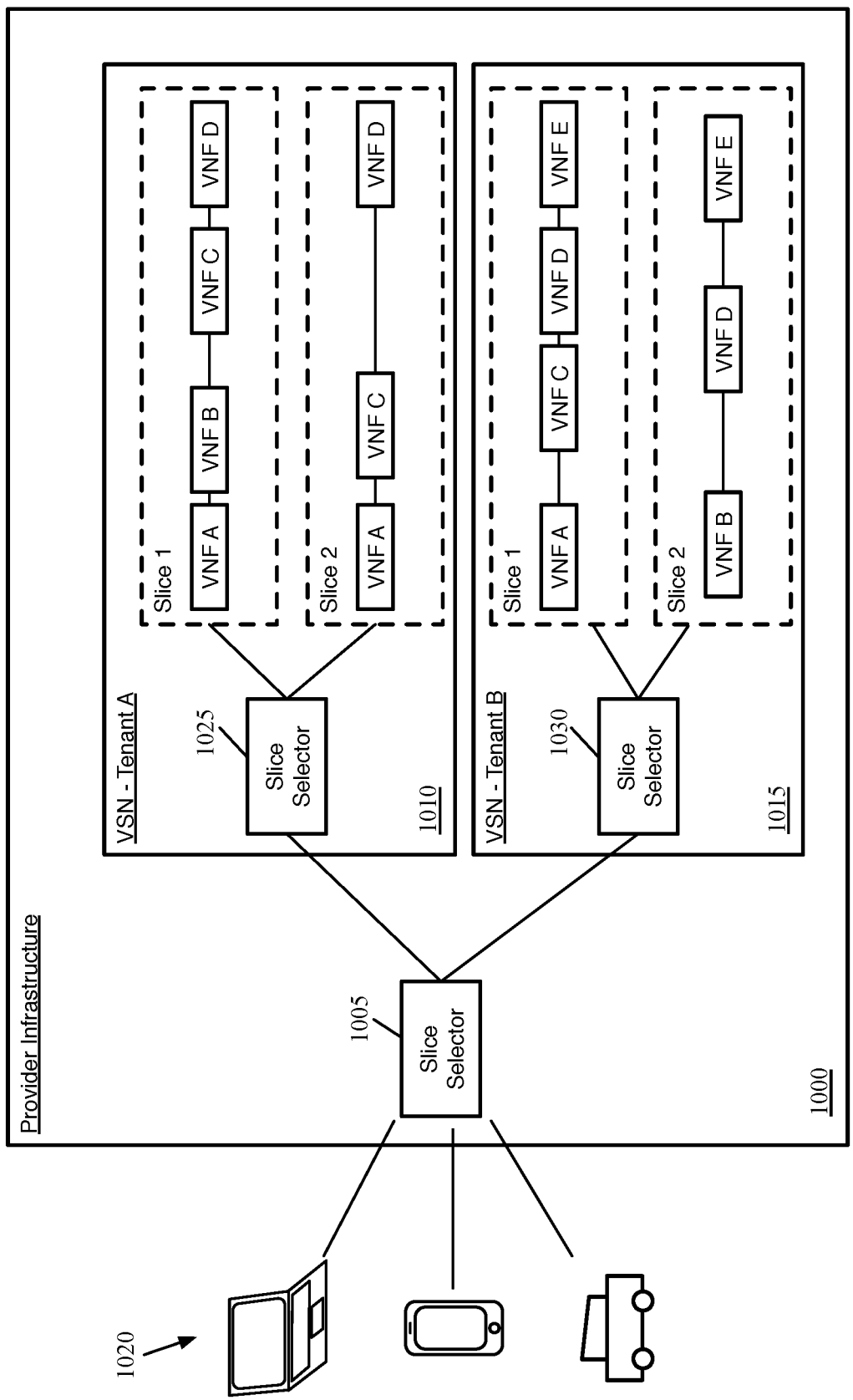
FIG. 10 conceptually illustrates an example of hierarchical VSNs.

FIG. 10 conceptually illustrates an example of such hierarchical virtual service networks. Specifically, this figure illustrates a provider infrastructure 1000 with a slice selector 1005 that selects between two separate virtual service networks 1010 and 1015, each of which has multiple slices. The provider infrastructure 1000 is its own top-level virtual service network with a slice selector 1005 that receives data traffic from various devices 1020 (e.g., computers, smart phones, tablets, self-driving automobiles, IoT devices) and assigns this data traffic to one of two different lower-level virtual service networks 1010 and 1015.

For example, in a telecommunications service provider network of some embodiments, a mobile network operator (MNO) owns the physical infrastructure 1000 of the access and core networks (i.e., the RAN and EPC infrastructure), and configures the slice selector 1005 to process traffic from devices that subscribe to the MNO. In addition, the MNO may lease the physical infrastructure to one or more mobile virtual network operators (MVNOs) that also have subscriber devices using the same infrastructure. Those MVNOs, in some cases, also lease their virtual infrastructure to additional MVNOs or other entities. In the example of FIG. 10, the MNO might configure the slice selector 1005 to select between the VSN 1010 of tenant A (for its own subscriber devices) and the VSN 1015 of tenant B (for subscriber devices of an MVNO).

For example, the slice selector 1005 configured by the MNO assigns data messages to either VSN 1010 or VSN 1015 based on the source device (e.g., by source network address). Thus, data messages from source devices associated with the MNO are sent to the VSN 1010 while data messages from source devices associated with the MVNO is sent to the VSN 1015, which is configured by the MVNO. If additional MVNOs lease the infrastructure as well, then the slice selector 1005 would have additional VSNs from which to select (with each MVNO able to configure the slice selector and sets of network services for the slices of its own VSN).

Each of the VSNs 1010 and 1015 has its own respective slice selector 1025 and 1030 as well. In the example, each of these slice selectors 1025 and 1030 chooses between two possible network slices, but it should be understood that just as the provider infrastructure may have numerous VSNs from which the top-level slice selector 1005 chooses, each of the VSNs will often include numerous slices. In some embodiments, these slice selectors 1010 and 1015 for the tenant VSNs perform additional slice selection based on various aspects of the data message headers. For example, while the top-level slice selector 1005 selects VSNs based on the source device network address in some embodiments, the lower-level slice selectors 1010 and 1015 might assign data messages to slices in the stateful manner described above (e.g., using deep packet inspection to assign connections to slices in an application-aware manner).

Figure 11:
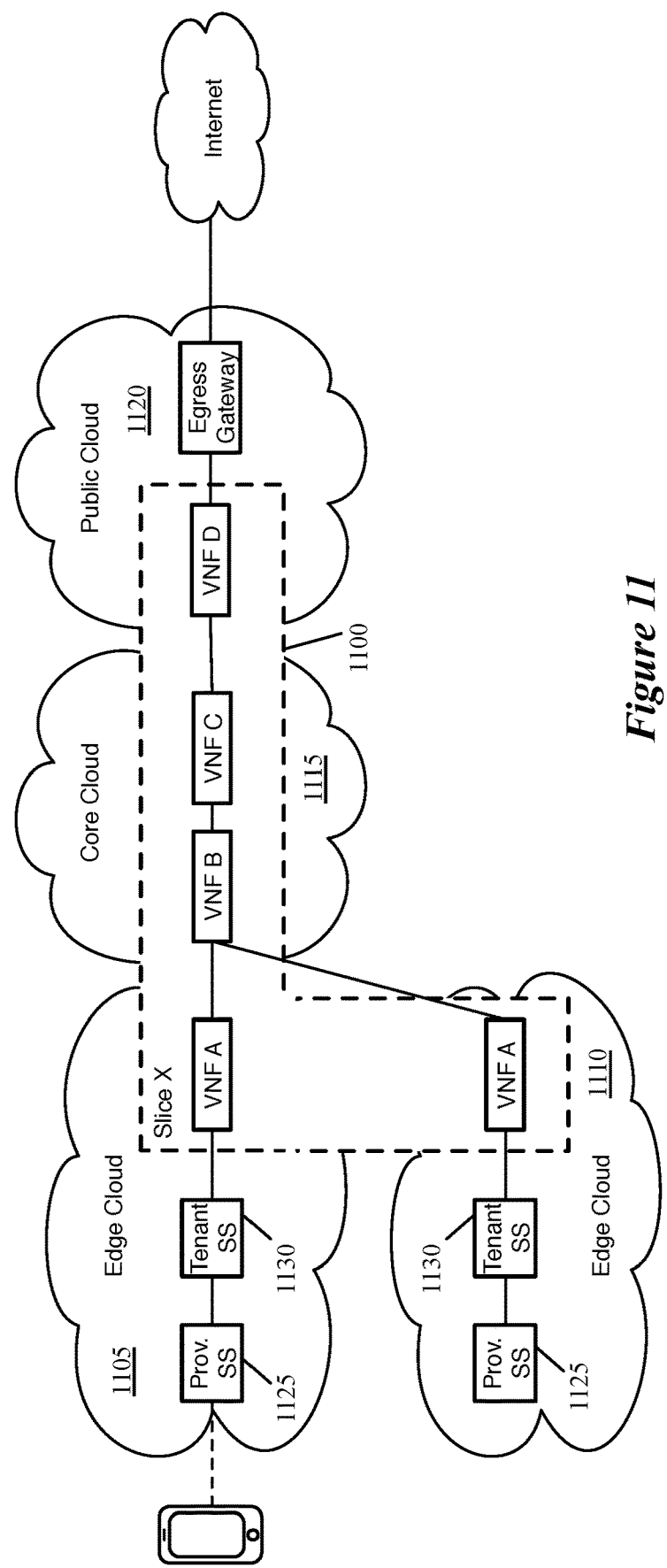
FIG. 11 conceptually illustrates the distribution of provider and tenant slice selectors (as well as the network services of a network slice) over multiple datacenters.

FIG. 11 conceptually illustrates the distribution of provider and tenant slice selectors (as well as the network services of a network slice) over multiple datacenters 1105-1120. As shown, in this example, both the provider slice selectors 1125 and the tenant slice selectors 1130 are implemented in each of the edge clouds 1105 and 1110. In addition, though not shown, each other tenant slice selector would also be implemented in each of the edge clouds (unless other tenant slice selectors were implemented in the core clouds, which some embodiments allow if none of the network services for any of the slices of those tenant VSNs were instantiated in the edge clouds). In addition, as in FIG. 2, the network services (VNF A-D) of the illustrated network slice 1100 are distributed between the edge clouds 1105 and 1110, the core cloud 1115, and the public cloud 1120.

Just as a single level of slice selector may be implemented in different ways (e.g., as a flow-based forwarding element operating within a VM or virtualization software, as a programmable physical forwarding element, as a separate set of modules executing between a VM and a port of a software forwarding element), different embodiments implement the multiple levels of slice selectors 1125 and 1130 in different ways. When the form factor for the slice selector is a VM or a forwarding element executing within a VM, some embodiments use separate VMs for each instance of the provider slice selector 1125 and each instance of the tenant slice selector 1130 (and any other tenant slice selectors). This allows, e.g., the provider admin to configure the VM and forwarding elements for the provider slice selector 1125 separately from the VMs and forwarding elements for each of the tenant slice selectors.

In this case, when the access network receives a data message, the message (after any preliminary processing, e.g., through the RAN) is first sent to the provider slice selector 1125. After the provider slice selector forwarding element selects one of the tenant VSNs (or the provider's own VSN, which is effectively another tenant VSN), the provider slice selector 1125 sends the data message to the slice selector 1130 for the selected tenant VSN in the same edge cloud (i.e., in this example, the edge cloud 1105). In some embodiments, the provider slice selector 1125 uses service chaining techniques to send the data message to the tenant slice selector 1130, while in other embodiments the provider slice selector 1125 is finished processing the data message at this point, and is simply configured to send the data message to the appropriate tenant slice selector (e.g., slice selector 1130).

This tenant slice selector 1130 receives the data message, performs slice selection and service chaining for its selected slice (i.e., in the same manner shown in FIG. 3), and then sends the data message through the egress gateway. If the network is distributed across multiple datacenters (i.e., as shown in this example), then the tenant VSN implementation includes service chaining modules in each of the datacenters in some embodiments. In some such embodiments, the provider slice selector 1125 does not perform service chaining (i.e., the tenant slice selector 1130 and/or service chaining module does not return data traffic to the provider slice selector after completion of the tenant network slice, and therefore provider service chaining modules are not required in the other datacenters.

In the example of FIG. 11, the mapping of provider slice selectors to tenant slice selectors is 1:1. However, in other embodiments, the top-level (provider) slice selector might be more distributed than the lower-level (tenant) slice selector. For example, in a 5G access network, a provider slice selector in some embodiments may be implemented at each DU, with the slice selectors for the various tenants implemented at each CU. In some such embodiments, the tenant slice selector uses MAC learning to determine to which provider slice selector return traffic should be sent. In many cases, only the tenant slice selector uses stateful connection to slice mappings, so only movement between regions associated with different tenant slice selectors causes the application of the state location sharing techniques described above by reference to FIGS. 5-7 (i.e., if the provider slice selector assigns data messages to network slices based on source network address or another value based on the source device, then stateful mappings are not required). In this situation, the tenant slice selector will use the learned MAC address to send return traffic to the correct provider slice selector, and the provider slice selector will be the correct provider slice selector for the current location of the device, as traffic will not need to be sent from one provider slice selector to another.

In some embodiments, rather than implementing the different levels of slice selectors separately, the lower-level (tenant) slice selectors are implemented in the same VM and/or forwarding element as the top-level (provider) slice selector. For instance, in some such embodiments, a first set of flow entries implement the provider slice selector and separate sets of flow entries implement each of the tenant slice selectors. Which of these separate sets of flow entries are evaluated (i.e., which of the tenant slice selectors evaluates a data message) depends on which of the first set of flow entries is matched by the first slice selector (i.e., to which tenant VSN the data message is assigned).

In a service insertion model for the slice selectors, in which the slice selection is performed as a service associated with a port of a software forwarding element, then some embodiments perform both top-level (provider) slice selection and lower-level (tenant) slice selection as separate services one after another. That is, a data message is intercepted initially by the provider slice selector, and then based on which tenant VSN is chosen, the data message is intercepted by one of the tenant slice selectors.

Figure 12:
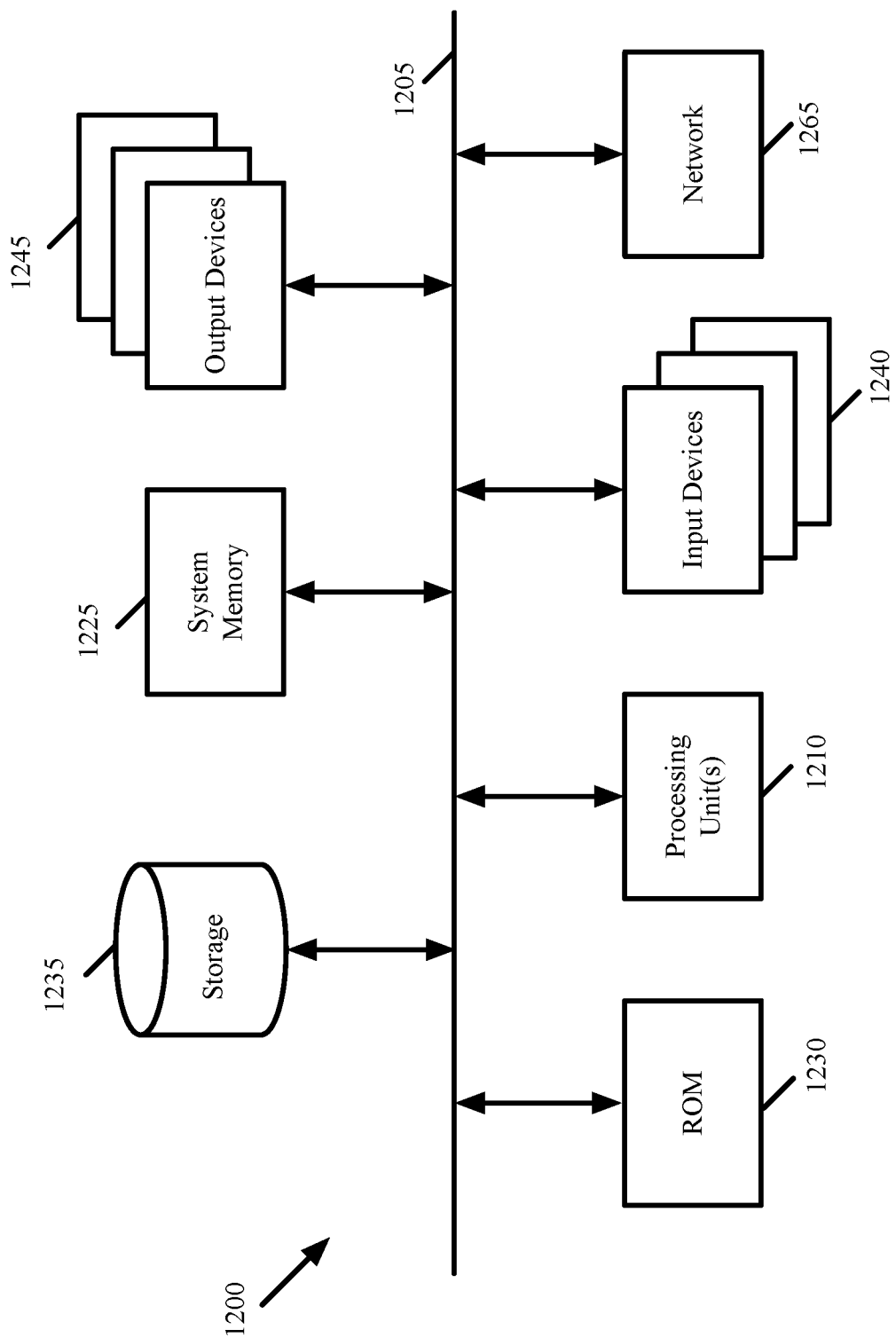
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such a random-access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given may be any type of DCNs, including physical hosts, VMs, non-VM containers, and hypervisor kernel network interface modules. In fact, the example networks might include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a first network slice selector that selects network slices for connections from endpoint devices located within a first geographic range, a method comprising:
   selecting a network slice for a connection between a mobile endpoint device and a network domain that originates when the mobile endpoint device is located within the first geographic range;
   storing a state that maps the connection to the selected network slice, wherein the stored state comprises a mapping of a connection 5-tuple to a network slice identifier, wherein the connection 5-tuple identifies source and destination network addresses, source and destination transport layer ports, and a transport protocol for the connection;
   forwarding data traffic belonging to the connection from the mobile endpoint device onto the selected network slice using the stored state; and
   after the mobile endpoint device moves from the first geographic range to a second geographic range, (i) receiving data traffic belonging to the connection from a second network slice selector that selects network slices for connections from endpoint devices within the second geographic range and (ii) forwarding said received data traffic onto the selected network slice using the stored state.

2. The method of claim 1, wherein selecting a network slice comprises:
   receiving a data message belonging to the connection from the mobile endpoint device; and
   analyzing the data message to select the network slice for the connection.

3. The method of claim 2, wherein analyzing the data message comprises performing deep packet inspection on the received data message to identify information about the connection.

4. The method of claim 3, wherein the information about the connection comprises at least one of (i) a destination domain name and (ii) information identifying a type of data being transmitted via the connection.

5. The method of claim 1, wherein the second network slice selector receives the data traffic from the mobile endpoint device while the mobile endpoint device is in the second geographic range, determines that the first network slice selector stores the state for the connection, and forwards the data traffic to the first network slice selector.

6. The method of claim 5, wherein the second network slice selector determines that the first network slice selector stores the state for the connection by sending a request to a central state repository.

7. The method of claim 6, wherein the central state repository is a central controller that provides configuration data for the first and second network slice selectors.

8. The method of claim 5 further comprising providing the second network slice selector with data indicating that the first network slice selector stores the state for the connection.

9. The method of claim 1, wherein the selected network slice comprises a set of network services to be applied to data messages forwarded onto the selected network slice.

10. The method of claim 9, wherein the selected network slice is a first network slice and the set of network functions is a first set of network services, wherein the plurality of network slices comprises at least a second network slice that comprises a second set of network services to be applied to data messages forwarded onto the second network slice.

11. A non-transitory machine readable medium storing a first network slice selector which when executed by at least one processing unit selects network slices for connections from endpoint devices located within a first geographic range, the first network slice selector comprising sets of instructions for:
   selecting a network slice for a connection between a mobile endpoint device and a network domain that originates when the mobile endpoint device is located within the first geographic range;
   storing a state that maps the connection to the selected network slice, wherein the stored state comprises a mapping of a connection 5-tuple to a network slice identifier, wherein the connection 5-tuple identifies source and destination network addresses, source and destination transport layer ports, and a transport protocol for the connection;
   forwarding data traffic belonging to the connection from the mobile endpoint device onto the selected network slice using the stored state; and
   after the mobile endpoint device moves from the first geographic range to a second geographic range, (i) receiving data traffic belonging to the connection from a second network slice selector that selects network slices for connections from endpoint devices within the second geographic range and (ii) forwarding said received data traffic onto the selected network slice using the stored state.

12. The non-transitory machine readable medium of claim 11, wherein the set of instructions for selecting a network slice comprises sets of instructions for:
   receiving a data message belonging to the connection from the mobile endpoint device; and
   analyzing the data message to select the network slice for the connection.

13. The non-transitory machine readable medium of claim 12, wherein the set of instructions for analyzing the data message comprises a set of instructions for performing deep packet inspection on the received data message to identify information about the connection.

14. The non-transitory machine readable medium of claim 11, wherein the second network slice selector receives the data traffic from the mobile endpoint device while the mobile endpoint device is in the second geographic range, determines that the first network slice selector stores the state for the connection, and forwards the data traffic to the first network slice selector.

15. The non-transitory machine readable medium of claim 11, wherein the selected network slice comprises a set of network services to be applied to data messages forwarded onto the selected network slice.

16. A system comprising:
   a first computing device executing a first network slice selector that selects network slices for connections from endpoint devices located within a first geographic range; and a second computing device executing a second network slice selector that selects network slices for connections from endpoint devices located within a second geographic range, wherein:

the first network slice selector (i) selects a network slice for a connection between a mobile endpoint device and a network domain that originates when the mobile endpoint device is located within the first geographic range, (ii) stores a state that maps the connection to the selected network slice, and forwards data traffic belonging to the connection from the mobile endpoint device onto the selected network slice using the stored state, wherein the stored state comprises a mapping of a connection 5-tuple to a network slice identifier, wherein the connection 5-tuple identifies source and destination network addresses, source and destination transport layer ports, and a transport protocol for the connection; and after the mobile endpoint device moves from the first geographic range to the second geographic range, the second network slice selector (i) receives data traffic belonging to the connection from the mobile endpoint device and (ii) forwards the received data traffic belonging to the connection to the first network slice selector for the first network slice selector to forward said data traffic onto the selected network slice using the stored state.

17. The system of claim 16 further comprising a central state repository, wherein the second network slice selector determines that the first network slice selector stores the state for the connection by sending a request to a central state repository.

18. The system of claim 17, wherein the central state repository is a central controller that provides configuration data for the first and second network slice selectors.

19. The system of claim 17, wherein the first network slice selector provides the central state repository with data indicating that the first network slice selector stores the state for the connection.

20. The system of claim 16, wherein the first network slice selector provides the second network slice selector with data indicating that the first network slice selector stores the state for the connection prior to the mobile endpoint device moving from the first geographic range to the second geographic range.

* * * * *